US012077013B2

(12) United States Patent
Hotte et al.

(10) Patent No.: US 12,077,013 B2
(45) Date of Patent: Sep. 3, 2024

(54) FRAME FOR RECEIVING AND APPLYING TENSION TO A CANVAS AND METHOD

(71) Applicant: CLICART INC., Terrebonne (CA)

(72) Inventors: Bernard Hotte, Boisbriand (CA); Patrick Duranceau, Montreal (CA)

( * ) Notice: Subject to any disclaimer, the term of this patent is extended or adjusted under 35 U.S.C. 154(b) by 537 days.

(21) Appl. No.: 17/283,707

(22) PCT Filed: Oct. 10, 2019

(86) PCT No.: PCT/CA2019/051447
§ 371 (c)(1),
(2) Date: Apr. 8, 2021

(87) PCT Pub. No.: WO2020/073130
PCT Pub. Date: Apr. 16, 2020

(65) Prior Publication Data

US 2021/0323344 A1 Oct. 21, 2021

Related U.S. Application Data

(60) Provisional application No. 62/745,022, filed on Oct. 12, 2018.

(51) Int. Cl.
*B44D 3/18* (2006.01)

(52) U.S. Cl.
CPC .................................... *B44D 3/185* (2013.01)

(58) Field of Classification Search
CPC . E06B 3/30; E06B 3/9646; E06B 9/24; B44D 3/185
See application file for complete search history.

(56) References Cited

U.S. PATENT DOCUMENTS 367,672 A 8/1887 Shattuck
3,477,574 A * 11/1969 Malfroy .................... B07B 1/48 209/403

(Continued)

FOREIGN PATENT DOCUMENTS

DE 19607382 A1 9/1996
DE 102013107013 A1 1/2015

(Continued)

OTHER PUBLICATIONS

International application No. PCT/CA2019/051447 International Search Report dated Dec. 31, 2019.

(Continued)

*Primary Examiner* — Beth A Stephan
(74) *Attorney, Agent, or Firm* — Anglehart et al.

(57) ABSTRACT

A method of applying tension to a canvas that is secured to a frame structure composed of frame members and corner pieces, wherein the frame members are interconnected using corner pieces adapted to receive ends of the frame members to form the frame structure, and wherein each of the frame members comprises a longitudinal axis. The method includes securing the canvas to a frame member; rotating the frame member around a rotation axis that is parallel with the length of the frame member, wherein the canvas, secured to the frame member, increases intension due to the rotation; and fixing the rotated frame member in the rotated position using the corner piece such that the increase in tension in the canvas is preserved.

19 Claims, 18 Drawing Sheets

(56) References Cited

U.S. PATENT DOCUMENTS

| | | | | | |
|---|---|---|---|---|---|
| 3,529,653 | A | | 9/1970 | Fey, Jr. | |
| 3,950,869 | A | | 4/1976 | Samarin | |
| 4,050,498 | A | | 9/1977 | Lucchetti | |
| 4,161,977 | A | | 7/1979 | Baslow | |
| 4,301,853 | A | | 11/1981 | Vidal | |
| 4,345,390 | A | | 8/1982 | Newman | |
| 4,570,406 | A | * | 2/1986 | DiFazio | E06B 3/9641 403/402 |
| 4,829,685 | A | | 5/1989 | Persson et al. | |
| 4,860,467 | A | * | 8/1989 | Larson | B41F 15/36 209/403 |
| 5,136,797 | A | * | 8/1992 | Hildebrandt | B41F 15/36 101/415.1 |
| 5,271,171 | A | * | 12/1993 | Smith | D06C 3/08 101/127.1 |
| 5,450,701 | A | | 9/1995 | White | |
| 6,163,995 | A | | 12/2000 | Lucchetti et al. | |
| 6,253,471 | B1 | | 7/2001 | Strauh | |
| 6,318,255 | B1 | * | 11/2001 | Larson | B41F 15/36 101/127.1 |
| 6,895,701 | B1 | | 5/2005 | Ocampo et al. | |
| 7,178,281 | B2 | | 2/2007 | Johansson et al. | |
| 8,122,624 | B2 | | 2/2012 | Vaz | |
| 8,307,880 | B2 | * | 11/2012 | Ocampo | B44D 3/185 160/381 |
| 8,413,356 | B2 | | 4/2013 | Vaz | |
| 8,453,362 | B2 | | 6/2013 | Cappelle et al. | |
| 8,522,681 | B2 | * | 9/2013 | Niswonger | B41F 15/36 101/127.1 |
| 8,607,700 | B2 | * | 12/2013 | Niswonger | B41F 15/36 101/127.1 |
| 8,936,065 | B1 | | 1/2015 | Gillespie | |
| 9,545,816 | B2 | | 1/2017 | Pluth et al. | |

FOREIGN PATENT DOCUMENTS

| | | | |
|---|---|---|---|
| EP | 2248960 | B1 | 1/2013 |
| EP | 3108773 | A1 | 12/2016 |
| FR | 2729103 | A1 | 7/1996 |
| GB | 2539220 | A | 12/2016 |
| WO | 2013/119105 | A2 | 8/2013 |

OTHER PUBLICATIONS

International application No. PCT/CA2019/051447 Search Strategy dated Dec. 31, 2019.

International application No. PCT/CA2019/051447 Written Opinion of the International Searching Authority dated Dec. 31, 2019.

GOframe, 1500 Canvas Stretching System, printed on Dec. 5, 2017, from https://www.goframe.com/stretcher-frame-bars-1500-standard-for-canvas/.

GOframe, Canvas Stretching System, printed on Dec. 5, 2017, from https://www.goframe.com/.

1 Corresponding Canadian patent application No. 3,115,846 Office Action dated Mar. 6, 2024.

* cited by examiner

FRAME FOR RECEIVING AND APPLYING TENSION TO A CANVAS AND METHOD

CROSS-REFERENCE TO RELATED APPLICATIONS

The present application claims priority from U.S. provisional patent application No. 62/745,022 filed on Oct. 12, 2018, incorporated herein by reference.

TECHNICAL FIELD

The present application relates to frames for receiving a canvas and mechanisms for securing and stretching a canvas attached to a frame structure.

BACKGROUND

Frame structures for receiving and securing a canvas thereon are usually adapted for different sizes of canvases. As a result, frames may be sold as a kit, where it is possible to provide frame members of different dimensions in order to accommodate the proportions of the canvas. As such, these frames require assembly, where the different segments are to be assembled into the frame that is to receive the canvas. These frame systems may be challenging to assemble, where the assembly may equally be time consuming, requiring additional equipment for stretching the canvas.

Moreover, a difficulty in placing the canvas and securing the canvas to the frame is that the canvas must then be stretched in order to apply sufficient tension to the canvas. The tension applied is also ideally uniform, in order to not damage the canvas and to avoid the creation of undesirable creases in the canvas. This can involve securing the canvas to the frame members, and manually pulling the canvas over the frame members. However, this process may result in an uneven application of tension to the canvas, resulting in a non-optimal finish.

Additionally, in order to secure the canvas to the frame, certain existing systems may use nails, where the canvas is nailed to the frame. However, this mechanism of securing the canvas to the frame results in the puncturing of the canvas, damaging of the frame and may increase the chance of tearing as undesirable strain is applied to the canvas or the frame. Additionally, when the canvas is secured to the frame, there is excess canvas material that may result at the corners of the canvas. This excess canvas can be concealed by nailing the canvas to the corners of the frame. The inserted nails may damage the frame and the canvas. Furthermore, the protruding nails can also lead to injury when the canvas is handled as a person's hands may come into contact and be the cut by the protruding nails.

SUMMARY

The present disclosure relates to a frame structure, where the canvas is fastened to its frame members, that allows for its frame members to rotate along a rotational axis parallel to the length of the frame, providing an effective mechanism for uniformly applying tension to the canvas such that the canvas is taut. The rotated segments are then held in their rotated configuration by corner pieces to which the frame members are connected.

The present disclosure further discloses that a corner piece adapted to receive at least two frame members forming the side of the frame, can also provide an inner cavity into which excess canvas material located at the corner of the canvas can be placed. Placing the canvas in the cavity of the corner piece avoids the need of having to staple or nail the canvas to the frame, which can be tedious and time consuming.

The present disclosure also teaches that a frame member can provide for a cavity running along its length into which the canvas may be placed. A fastening clip can then be used to hook, at one of its extremities, onto the edge of the frame member and, at the other extremity, secured into the cavity of the frame member. The fastening clip is thus adapted to be secured to the frame member and fix the canvas to the frame member. The use of the fastening clip avoids the use of nails or staples for securing the canvas to the frame members.

A broad aspect of the present disclosure is a method of applying tension to a canvas that is secured to a frame structure composed of frame members and corner pieces, wherein the frame members are interconnected using the corner pieces adapted to receive ends of the frame members to form the frame structure, and wherein each of the frame members comprises a longitudinal axis. The method includes securing the canvas to a frame member. The method includes rotating the frame member around a rotational axis that is parallel with the length of the frame member, wherein the canvas, secured to the frame member, increases in tension due to the rotation. The method includes fixing the rotated frame member in the rotated position using the corner piece such that the increase in tension in the canvas is preserved.

In some embodiments, the frame member may have an elongated prism body, and wherein the frame member, prior to rotation, may rest on an edge of the prism body on a flat surface, and after rotation, a face of the rotated frame member may be resting on the flat surface.

In some embodiments, the canvas, after the rotation, may rest on a face of the frame member opposite the face resting on the flat surface.

In some embodiments, the frame member that is rotated may be at an angle with a flat surface while the corner piece has one of its faces flat on the flat surface, and wherein the rotated frame member may rest flat on the flat surface and the corner piece may rest on the one of its faces flat on the flat surface.

In some embodiments, the frame member may be connected to a face of the corner piece, and wherein the rotated frame member may be fixed in the rotated position using a protrusion of the corner piece.

In some embodiments, the protrusion may be located on the face of the corner piece.

In some embodiments, the method may include placing excess canvas material in a cavity of the corner piece.

In some embodiments, after the placing excess canvas material in a cavity of the corner piece, the method may include fitting a cap on a face of the corner piece comprising an opening providing access to the cavity.

In some embodiments, the rotational axis may be aligned with an axis running centrally along the length of a connector of the corner piece for connecting the corner piece to the frame member.

In some embodiments, the frame member may be rotated along the rotational axis in a direction such that, after the rotation, a greater portion of the canvas may contour the shape of the elongated body of the frame member than prior to the rotation.

Another broad aspect is a corner piece adapted to connect to ends of frame members of a frame assembly for receiving and securing a canvas. The corner piece includes a rectangular prism body including an inner cavity adapted to receive excess canvas material; a first face having a flat portion; a second face, opposite to the first face, comprising an opening providing access to the inner cavity; a first connector located on a third face, the first connector adapted to connect to a first frame member of the frame members; and a second connector located on a fourth face that meets at an angle with the third face, the second connector adapted to connect to a second frame member of the frame members. The corner piece includes a fastener configured to secure in the inner cavity the excess canvas material that is received in the inner cavity.

In some embodiments, the fastener may be a cap configured to fit to the second face of the rectangular prism body and cover the opening, sealing the inner cavity, wherein the cap fitted to the second face may secure the excess canvas material that is received in the inner cavity.

In some embodiments, the cap may be detachable from the prism body.

In some embodiments, the first connector may be a first protrusion, and the second connector may be a second protrusion.

In some embodiments, the first protrusion and the second protrusion may be each a male end configured to be placed into a corresponding female cavity or channel of a frame member.

In some embodiments, each of the first protrusion and the second protrusion may include an abutting protuberance on its surface configured to limit rotation of the frame member connected to the corner piece.

In some embodiments, the corner piece may be made out of plastic.

In some embodiments, the corner piece may be one of die casted and 3D printed.

In some embodiments, the rectangular prism body may include a locking projection extending upward and out from the opening of the second face, and the locking projection may be configured to pass through an opening of the cap and fasten the cap to the prism body.

In some embodiments, the end of the locking projection that is extending upward and out from the opening may be hooked.

In some embodiments, the corner piece may include, on the edges forming the opening, indentations adapted to receive the cap, and the cap may include along its edges protrusions adapted to mate with the indentations.

Another broad aspect is a fastening clip for securing canvas to a frame member of a frame, the frame member comprising a cavity running along at least a portion of a length of the frame member for receiving the canvas. The fastening clip includes an elongated body with a flat surface; at least two tongue projections interspersed along a first edge of the elongated body, the at least two tongue projections oriented in a same plane as the flat surface, wherein each of the at least two tongue projections comprises a hooked tooth at an end of the tongue projection, the hooked tooth extending at an angle away from the tongue projection for hooking onto a first edge of the frame member; and an angled projection situated on a second edge of the elongated body opposite the first edge, the angled projection extending at an angle away from the elongated body such that the angled projection and the hooked tooth are located on a same side with respect to the elongated body, the angled projection for being received in the cavity of the frame member and securing canvas into the cavity.

In some embodiments, the at least two tongue projections may include three tongue projections interspersed along the first edge of the elongated body.

In some embodiments, the fastening clip may be made out of plastic.

In some embodiments, the angled projection may include at least one additional protruding portion parallel to the flat surface of the elongated body, where the at least one additional protruding portion may protrude in a direction opposite to that of the at least two tongue projections.

In some embodiments, the number of the at least one additional protruding portion may be equal to the number of the at least two tongue projections.

In some embodiments, each of the at least two tongue projections may be positioned, with respect to the elongated body, vis-à-vis each of the at least one additional protruding portion.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to a frame structure adapted to receive and secure a canvas, and apply additional tension to the canvas, once secured, such that the canvas is taut.

In the present disclosure, for purposes of illustration, reference is made to an exemplary embodiment of a four-sided frame, forming with the canvas a single face. However, it will be understood that the frame structure may be adapted to produce different shapes and configurations, such as a triangular frame, a frame structure shaped as a polyhedron—where the canvas and the frame form a three-dimensional shape), etc.

Depending on the desired shape, the number of frame members, and the configuration and the properties of the corner pieces and its connectors may vary as described herein.

In the present disclosure, reference is made to “canvas”, a cloth made from hemp, flax, cotton, wood fibre, or a similar yarn or material, such as one used for receiving paint, ink, etc. However, it will be understood that the frame structure and the aspects disclosed in the present disclosure may also be used in association with other flexible sheets of material, such as tarp material, thin plastics, geotextile material, vinyl, etc., that require securing and tightening in order to shape to the frame structure. The use of the word “canvas” used herein may encompass these other flexible sheets of material.

Figure 8:
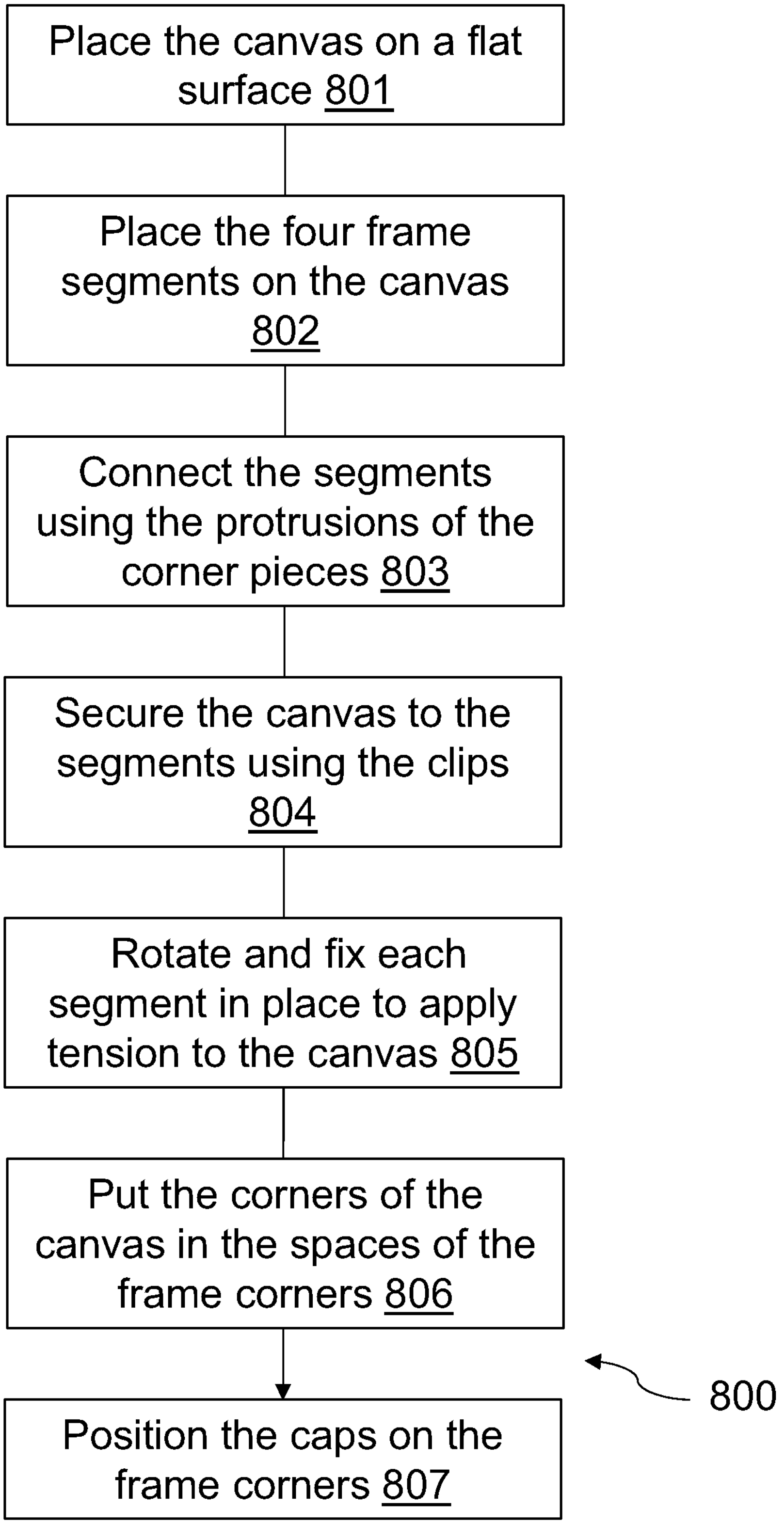
FIG. 8 is a flowchart diagram of an exemplary method of securing a canvas to a frame structure and applying tension thereto such that the canvas is taut.

A Method of Securing a Canvas to a Frame Structure:

Reference is now made to FIG. 8, illustrating an exemplary method 800 of securing a canvas to a frame such that the canvas is taut over the frame.

The sheet of canvas may be first placed on a flat surface at step 801. It will be understood that the placement of the canvas on a flat surface is to facilitate the assembly of the canvas to the frame structure and to avoid folds or damaging the canvas.

Each of the four frame members are then placed on either side of the canvas, each of the frame members placed near a side edge of the canvas sheet at step 802. It will be understood that when the canvas does not have the shape of a parallelogram, having more than or less than four sides, and/or when the desired frame structure is to be other than a parallelogram, a number of frame members may be placed corresponding to the number of sides of the desired shape of the frame structure to which the canvas will be secured. In some examples, when the canvas is to be assembled to a frame structure that will result in a three-dimensional shape, the user may proceed, face by face, in fastening the canvas to each frame member for building one of the faces prior to proceeding to the next face.

In some examples, the frame members may be tailored to the dimensions of the canvas sheet. In other examples, the frame members may be built from a series of segments that can be interconnected, where the number of segments used to build a frame member is related to the desired length of the frame member.

The corner pieces may then be placed on the canvas, positioned where the frame members are to meet, the corner pieces acting as the corners of the frame. The frame segments may then be connected to one another using the corner piece at step 803. The corner piece may provide connectors for receiving the frame segments. In some examples, the corner piece may have on its faces a male connector for inserting into a cavity or channel of the frame member, forming a connection. The insertion of the male connector within the cavity or channel of the frame member may result in a snug or tight connection, where an applied force may be necessary to pull the frame member and the corner piece apart. The connecting of the frame members and the corner pieces is repeated for every corner, resulting, in the present example, in a parallelogram (the resulting shape may vary depending of the desired shape of the frame structure, the number of frame members and corner pieces used, etc.)

In some examples, when the frame members have a prism body and are connected to the corner piece, the frame members are at a slight angle with the flat surface, where the corner pieces are resting flat on the flat surface. In some examples, the frame members may be cylindrical.

The canvas is then secured to the frame members at step 804. In some examples, the frame member may include a groove or furrow running along its length. A fastening clip may be used to push the canvas into the groove or furrow of the frame member, and clip onto an edge of the frame member. The clipped fastening clip secures the canvas to the frame member.

Once the canvas is secured to the frame members, the frame members are then rotated along a rotational axis parallel to the length of the frame member at step 805.

As the canvas is secured to the frame member, the rotating of the frame member results in pulling of the canvas, applying tension to the canvas, the canvas becoming tauter as a result. The rotation is performed in a direction to apply tension to the canvas (e.g. pulling the canvas away from its center). The rotating is repeated for each frame member. Once the frame member has undergone a certain rotation, the corner piece is used to fix the rotated frame member in place, maintaining the tension applied to the canvas. In some examples, the corner piece may have a flexible locking projection at its base that gets pushed inward when the edge of the frame member (or a force exerted by the user) applies pressure to its side. The locking projection then springs back forward after the frame member has undergone the desired rotation, the now forward-positioned locking projection creating a barrier preventing the frame member from rotating back. In other examples, the corner piece may have, at its connector, a protrusion acting like a crank of a ratchet, and the frame member may have a portion for mating with the connector shaped like a notch for a geneva wheel or a ratchet wheel. It will be understood that other mechanisms may be provided to have the corner piece fix the frame member in its rotated position.

In some examples, the fixing of the frame member in the rotated position may also allow for removal and disconnection of the frame member from the corner during disassembly of the frame.

Now that tension is applied to the canvas and the canvas is taut, there may be excess canvas material located at or near the canvas corners. The excess canvas material may be stowed, for each canvas corner, in a cavity of the respective corner piece for receiving the excess canvas at step 806.

A cap may then be positioned on the face of the corner piece providing the opening giving access to the cavity for receiving the excess canvas material at step 807. The cap, placed on the face with the opening, retains the canvas in the cavity and covers the opening. The cap acts as a fastener. However, it is apparent that any other fastener may be positioned in or above the inner cavity to secure the canvas to the inner cavity without departing from the present teachings.

The canvas is then assembled to the frame structure.

As mentioned herein, the canvas structure may be multi-faceted or form a three-dimensional object (e.g. a polyhedron). In such examples, the method 800 may be repeated for each of the faces composing the canvas structure, resulting in the canvassed frame structure.

In some examples of a multi-faceted canvas structure, a single canvas piece may be adapted and used to cover each of the faces. In other examples of a multi-faceted canvas structure, a separate canvas piece may be used for each of the faces, or for some of the faces.

Figure 1B:
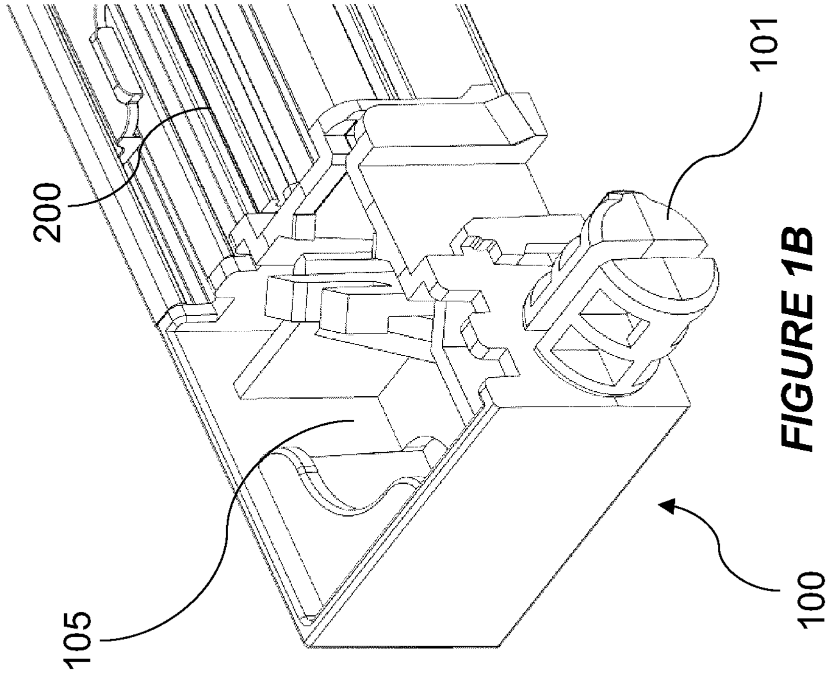
FIG. 1B is a drawing of a side-view of an exemplary corner piece attached to an exemplary frame member.
Figure 1A:
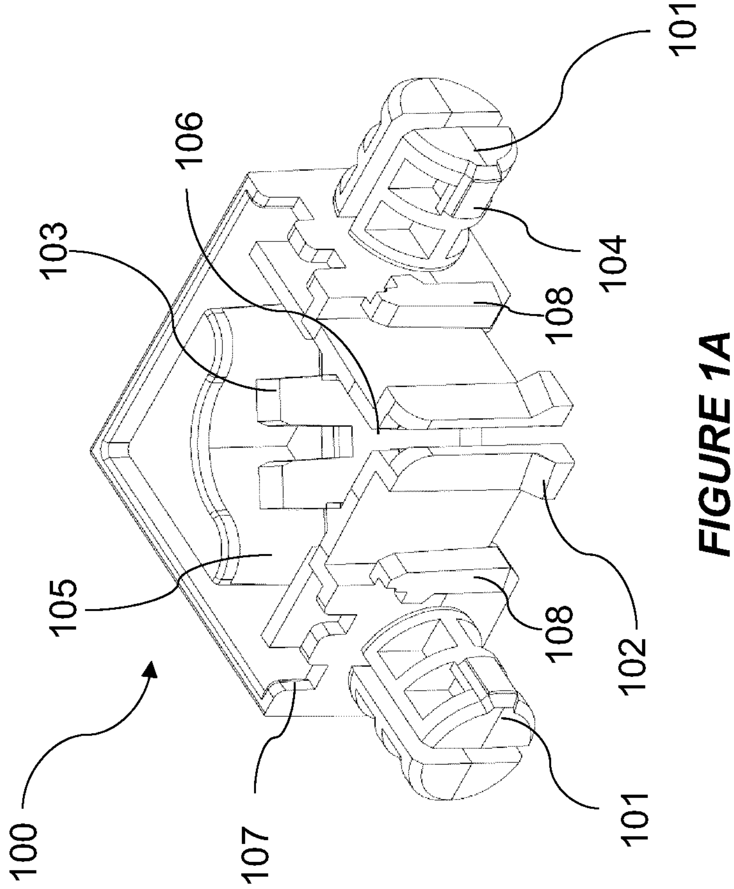
FIG. 1A is a drawing of a front perspective view of an exemplary corner piece.

The Corner Piece:

Reference is now made to FIGS. 1A and 1B, illustrating an exemplary corner piece 100 for connecting frame members 200 and for receiving excess canvas within a cavity. In FIG. 1B, the corner piece 100 is shown as being connected to a frame member 200.

The corner piece 100 is used to connect together different frame members 200. In some examples, the corner piece 100 may be adapted to connect to two frame members 200, such as when the resulting frame structure has a parallelogram form (e.g. a rectangular prism body, such as a cube). However, it is will understood that the corner piece 100 may be further adapted to connect to more than two frame members 200, such as when the resulting frame structure has a three-dimensional shape, forming, for instance, a polyhedron (e.g. a prism, etc.).

The corner piece 100 is also configured to receive and store excess canvas material once the canvas is secured to the frame. This storing of the canvas prevents having to nail or staple the canvas to the frame.

In some examples, the corner piece 100 may have a prism or cubic shape. However, the shape of the corner piece 100 may vary, depending on the desired configured of the frame structure. For example, if the frame structure is to have a pyramidal shape, the corner piece 100 may equally have at least a pyramidal portion, with a connector located on each of three of its faces.

The corner piece may be made out of a plastic, metal, a composite material, etc.

The corner piece may be 3D printed or die-casted.

The corner piece 100 includes an opening on one of its faces providing access to an inner cavity 105. The corner piece also includes at least two connectors 101, each of the connectors 101 for connecting to a corresponding frame member 200. The corner piece 100 may also have a front spacing 106 for receiving a corresponding stabilizing protrusion 302 of the cap 300. The corner piece 100 may also have a locking projection 103 and a cap-receiving indentation 107.

The corner piece 100 also has a locking mechanism, such as a locking projection 102 for fixing the rotated frame member 200 in its rotated position.

The inner cavity 105 is a compartment within the body of the corner piece 100 for receiving excess canvas material corresponding to the corner of the canvas. The canvas material is stored within the inner cavity 105. The dimensions of the cavity 105 are sufficient to receive the excess canvas material, considering the possible rigidity of the canvas material. An opening on one the faces of the corner piece 100 is provided, giving access to the inner cavity 105. As shown in FIG. 1A, the corner piece 100 may be hollow, where the outer walls of the corner piece 100 define the inner cavity 105.

The connector 101 is located on a face of the corner piece 100. The connector 101 is used to connect the corner piece 100 to the frame member 200. Once connected, the corner piece 100 and the connected frame member 200 may touch. The male and female parts have a key that serves as indexing (positioning) to give a starting angle for the all side extrusions The corner piece 100 may include two connectors 101, each providing a connection to a respective frame member 200. Each of the two connectors 101 is located on a separate face of the corner piece 100. The faces on which the connectors 101 are positioned may intersect at an angle with respect to one another, as shown in FIG. 1A. However, it will be understood that the position of the connectors 101 on the different faces of the corner piece 100 and the number of connectors 101 may vary depending on the frame structure that is to be achieved. For example, when the frame structure is to have a cubic shape, each of the corner pieces 100 may be adapted to have three connectors 101. The first and second connectors 101 may be located on two adjacent faces that are orthogonal and in contact with one another, where the third connector 101 may be placed on a third face that is orthogonal to the other two faces of the corner piece and in contact with the two other faces of the corner piece (not shown).

The connector 101 may be shaped as a male protrusion, adapted to be inserted into a corresponding channel of a cavity of the frame member 200. The male protrusion may have a cylindrical shape. It will be understood that the shape of the male protrusion may vary depending on the corresponding shape of the cavity or channel of the frame member 200 (e.g. a prism shape).

In some examples, the connector 101 may be shaped as a female spacing or cavity into which the male protrusion of the frame member 200 be placed (not shown). This connector 101 shaped as a male spacing may enter or be an opening into the inner cavity 105, where the connected frame member 200 and corner piece 100 touch.

In some examples, the connector 101 may be a bolt or a screw attached to a face of the corner piece and protruding from its side, adapted to be inserted into the end of the frame member 200, while allowing a certain degree of freedom such that the connected frame member 200 may rotate while the corner piece 100 remains in its unrotated position.

In some examples, the connector 101 itself may rotate, providing the rotating mechanism for adding tension to the canvas. In other examples, the connector 101 allows the frame member 200 to undergo a rotation such that it may rotate with respect to the corner piece 100, the corner piece 100 adapted to not rotate with the frame member 200.

In some embodiments, the connected corner piece 100 and the frame member 200 provide a snug fit, where an exerted force is required to separate the corner piece 100 and the connector 101 (e.g. the corner piece 100 and the frame member 200 may be pulled apart to separate one from the other).

In some examples, the connector 101 provides an abutting protuberance 104 for limiting the rotation and movement of the frame member 200 (e.g. around the connector 101). The abutting protuberance 104 may extend out from a portion of the connector 101, as shown in FIG. 1A, configured to meet with an edge of the frame member 200 and providing a barrier preventing the frame member 200 from further rotating.

The connector 101 may have a flat outer face at its end opposite to the end connected to the face of the corner piece 100. The properties of the outer face may face may vary.

The dimensions of the connector 101 may vary depending on the size of the frame member 200 and its corresponding connecting portion. The connector 101 may be dimensioned to receive the corresponding frame member 200, withstand torque resulting from the rotation of the frame member 200 and/or retain tightly the connected frame member 200.

The corner piece 100 has a locking mechanism for fixing the rotated frame member 200 in its rotated position. The corner piece 100, once connected to frame member 200, allows for the frame member 200 to undergo a certain amount of rotation along a rotation axis parallel to a length of the frame member 200. The rotation axis may be in line or defined by the axis running centrally along the length of the connector 101.

The locking mechanism prevents the rotated frame member 200, now subject to a torque caused by the canvas under tension, from returning to its unrotated position. This maintains the added tension applied to the canvas.

For instance, the locking mechanism may be a flexible locking projection 102, with a certain resistance, at the base of the corner piece 100, that gets pushed inward when the edge of the frame member 200 applies pressure to the side of locking projection 102. The locking projection 102 may also be pushed inward when a user presses it inward, the pressing inward allowing the frame member 200 to continue rotating. The locking projection 102 may have a surface (e.g. a slanted surface) that is shaped to allow the edge of the frame member 200 to rotate. The locking projection 102 may then spring forward to its position at rest after the frame member 200 has undergone the desired rotation, the now forward-positioned locking projection 102 creating a barrier preventing the frame member from rotating back. When in an unrotated position, the frame segment 200 may also rest on an upper surface of the locking projection 102. In some examples, the locking mechanism may include a stopper 108 (e.g. vertical stopper 108) for further defining the range of movement of the frame member 200 around the connector 101.

In some examples, the locking mechanism may be a tooth that can protrude from a base or side of the corner piece into a corresponding cavity of the frame member 200 when the frame member 200 has undergone a certain rotation. The tooth may be retractable, either with a spring mechanism or with manual intervention, and can be pushed or may spring into the cavity of the frame member 200 when the cavity of the frame member 200 is aligned with the tooth (not shown).

In some other examples, the rotating mechanism may be combined with the locking mechanism. For instance, the connector 101 may rotate along its longitudinal axis in a designated direction (e.g. the rotation restricted to one directed due to, e.g., a pawl and ratchet wheel mechanism) distinctly from the rest of the corner piece 100. Once the frame member 200 connected to the connector 101, the connector 101 may rotate, where the rest of the corner piece 100 does not rotate, causing the frame member 200 to rotate in tandem, until the canvas has reached the desired tautness. Once the rotation complete, as the connector 101, and the frame member 200 secured thereto, can only rotate in one direction, the rotation mechanism prevents the rotated frame member 200 from rotating in the opposite direction, avoiding a loss in the tension applied to the canvas (not shown).

The corner piece 100 may also have, along the edges of the walls that define the opening for the inner cavity 105, an indentation or indentations 107 for receiving corresponding protrusions 304 of the cap 300 of the corner piece 100. The indentations 107 assist in securing the cap 300 of the corner piece 100 to the prism body of the corner piece 100.

The corner piece 100 may also have a corresponding front spacing 106 for receiving a stabilizing portion 302 of the cap 300, and further securing the cap 300 to the face of the corner piece 100 with the opening providing access to the inner cavity 105. When the stabilizing portion 302 of the cap 300 is shaped as an arrowhead, the front spacing 106 of the corner piece 100 may also be shaped to accommodate the arrowhead shape of the stabilizing portion 302.

The locking projection 103 is adapted to lock the cap 300 once placed over the face of the corner piece 100 with the opening for providing access to the inner cavity 105. The locking projection 103 may have a hooked end portion extending from the opening of the inner cavity 105, the hooked end portion for fitting into a corresponding space 303 of the cap 300, and to hook the cap 300 to the prism body of the corner piece 100 once the hook portion protrudes from the space 303. In some examples, as shown in FIG. 1A, the locking projection 103 may be shaped as a fork (e.g. a two-prong fork). The locking projection 103 may have a resistance that is adapted to move under applied force to allow the cap 300 to be removed.

In some examples, the corner piece 100 may have a locking mechanism, other than the locking projection 103, for securing the cap 300 to the face of the prism body of the corner piece 100 with an opening providing access to the inner cavity 105. The locking mechanism may be, for example, a latch, a clip, ad adhesive material, an elastic band, etc.

Therefore, it will be understood that the corner piece 100 may have other locking mechanisms for securing the cap 300 to the prism body of the corner piece without departing from the present teachings. In fact, in some examples, the cap 300 may be configured as a lid that is connected (e.g. hinged) to the prism body of the corner piece 100, and that, for instance, has a clip or latch for securing the cap 300 to the prism body of the corner piece 100 (not shown).

In some examples, the corner piece 100 may not have a cap 300, but instead a fastener for securing the canvas in the inner cavity 105. For instance, the fastener may be a filled object (e.g. a dry putty) that fits into the inner cavity 105, putting pressure on the excess canvas material contained in the inner cavity 105, securing the canvas, while remaining fitted to the cavity until sufficient force is exerted onto the fastener to remove the fastener.

Figure 2A:
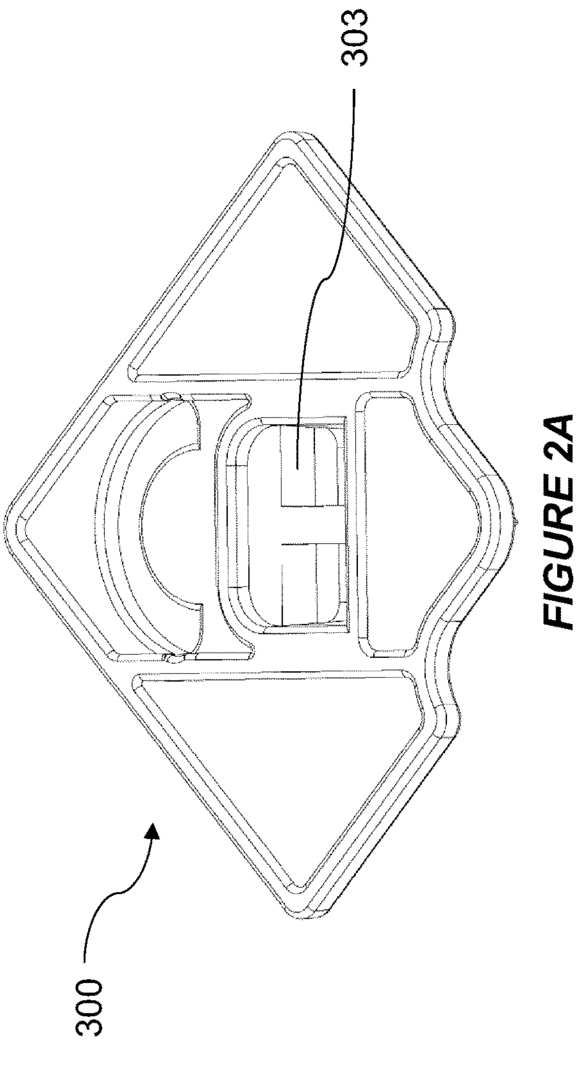
FIG. 2A is a drawing of a front-top perspective view of an exemplary cap for an exemplary corner piece.
Figure 2B:
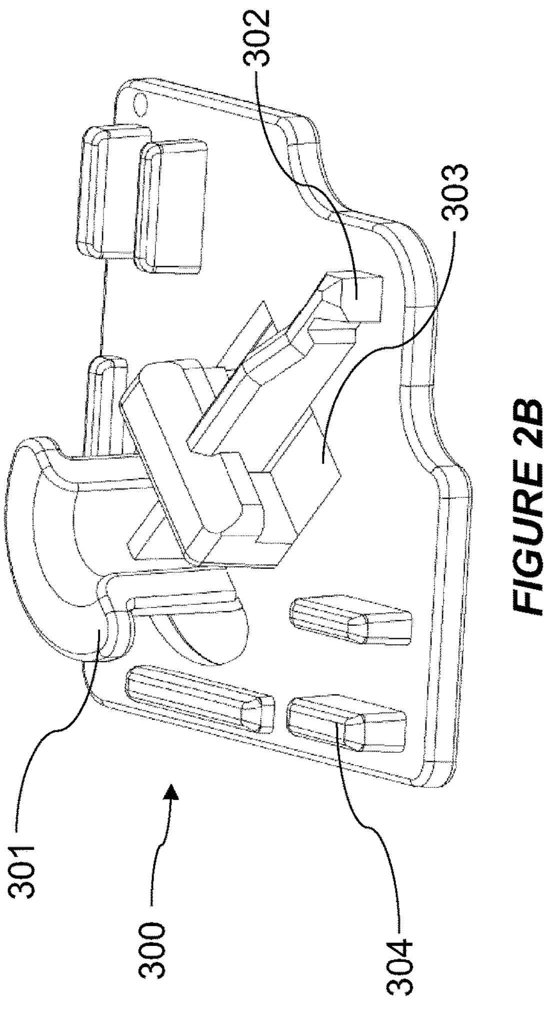
FIG. 2B is a drawing of a bottom-side perspective view of an exemplary cap for an exemplary corner piece.

The Cap:

Reference is now made to FIGS. 2A and 2B, illustrating an exemplary cap 300.

The corner piece 100 has a fastener for securing the canvas in the inner cavity 105. In some examples, the fastener is a cap 300.

The cap 300 is adapted to be placed over the face of the prism body of the corner piece 100 including the opening for providing access to the inner cavity 105. The cap 300 may then be secured to the face of the prism body of the corner piece 100 that includes the opening, covering the opening and securing the excess canvas material contained therein.

The cap may 300 include at least one space 303 for receiving a locking projection 103. The cap 300 may also include a securing protrusion 304, a lip 301 and/or a securing protrusion 304.

It will be understood that at least a portion of the cap 300 may be a solid surface acting as a lid. However, the surface may also be, e.g., a grid, and/or may contain openings.

The space 303 is shaped to receive the end of the locking projection 103. Therefore, the space 303 is dimensioned to allow an end portion of the locking projection 103 to pass through. When the locking projection 103 has a hooked end portion, the hooked end portion protrudes through the space 303, and extends outward such that the hook prevents the cap from being removed by pulling the cap off upward, the hook coming into contact with a portion of the cap 300 that surround the space 303, acting as a barrier.

The stabilizing portion 302 may be provided to further position the cap 300 with respect to the face of the prism body of the corner piece 100 including the opening for providing access to the inner cavity 105. The stabilizing portion 302 may be dimensioned to fit within the front spacing 106 of the prism body of the corner piece 100. The stabilizing portion 302 may have an arrowhead shape, defined by the joining of the walls of the prism body of the corner piece 100. However, it will be understood that the shape of the stabilizing portion 302 may vary without departing from the present teachings.

The cap 300 may also have securing protrusions 304 located near the edges of the cap 300, on the side of the cap 300 that is facing the inner cavity 105 when positioned onto the face with the opening of the prism body of the corner piece 100. The securing protrusions 304 are shaped and positioned to fit into the indentations 107, further securing and positioning the cap 300 onto the face of the prism body of the corner piece 100 with the opening providing access to the inner cavity 105.

A lip protrusion 301 may also be positioned on the cap 300 to further secure and position the cap 300 to the prism body of the corner piece 100.

Figure 3:
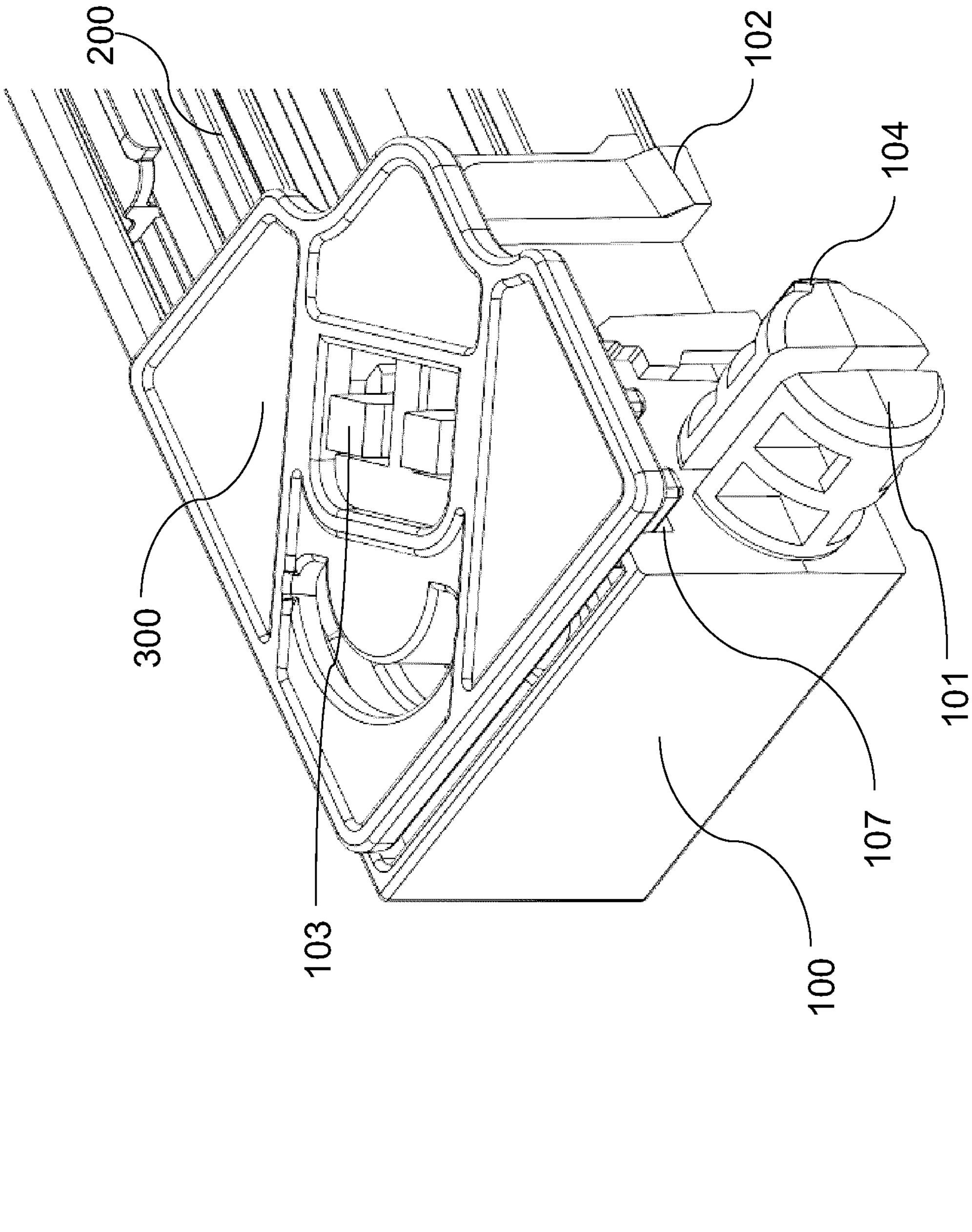
FIG. 3 is a drawing of a perspective side view of an exemplary corner piece fitted with an exemplary cap and joined to an exemplary frame member.

The Cap, Prism Body and Frame Member Assembly:

Reference is now made to FIG. 3, illustrating an exemplary cap 300 secured to an exemplary prism body of a corner piece 100. The corner piece 100 is further attached to a frame member 200 via one of its connectors 101.

It will be understood that the second connector 101, as shown in FIG. 3, may further receive another frame member 200. In the example of FIG. 3, the two frame members 200, once connected to the corner piece 100, will be orthogonal with respect to one another.

Figure 4A:
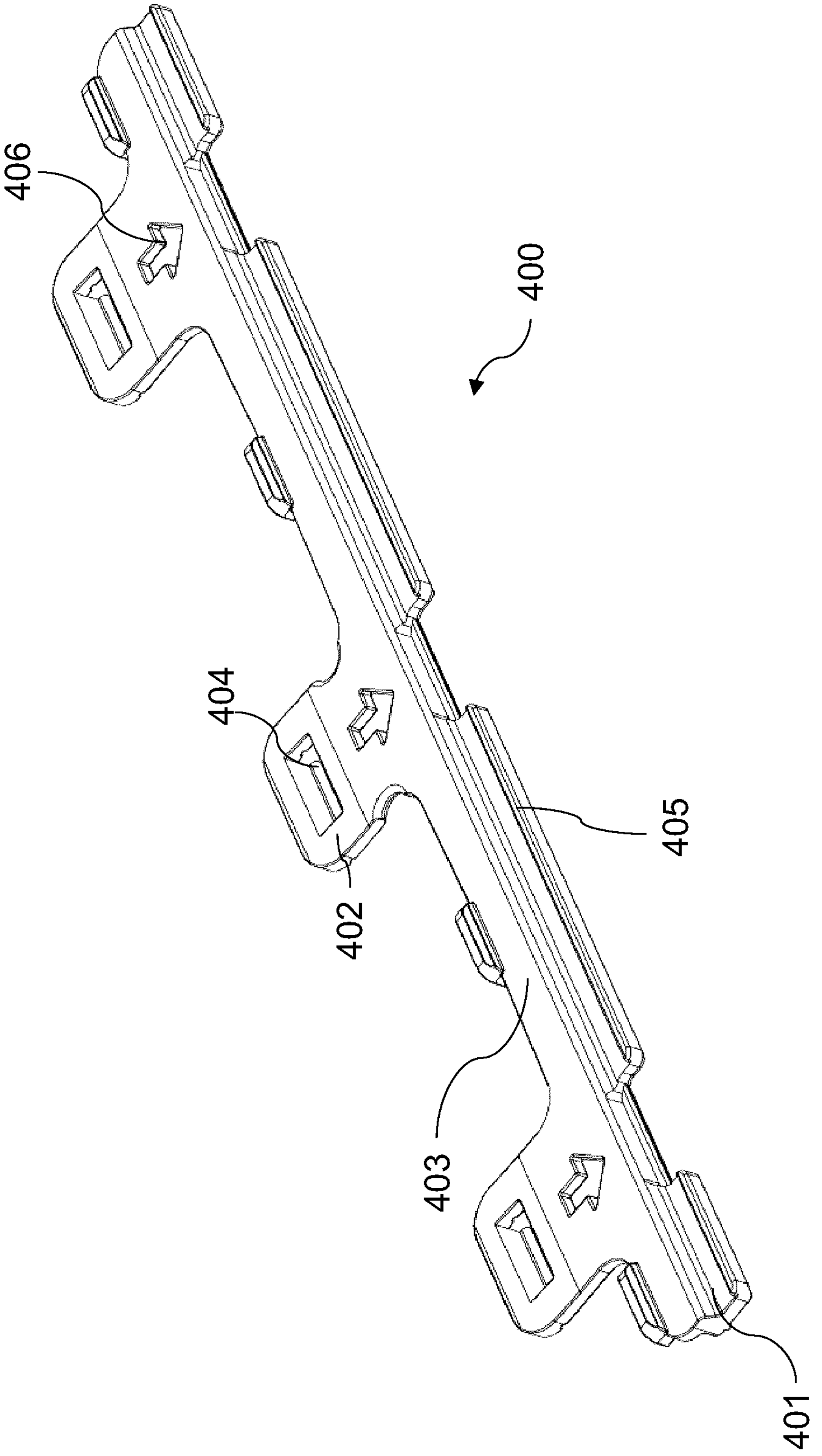
FIG. 4A is a drawing of a top perspective view of an exemplary fastening clip to be fitted to a furrow or cavity running the length of an exemplary frame member.

Fastening Clip:

Reference is now made to FIG. 4, illustrating an exemplary fastening clip 400 adapted to secure canvas to a frame member 200.

The fastening clip 400 secures the canvas to the frame member 200 while fastening onto the frame member 200, such that the fastening clip 400 and the canvas are secured to the frame member 200.

The fastening clip 400 has a main elongated body 403 with a length sufficient to span at least a portion of the length of the frame body 200, and a length that may be no greater than that of a cavity running along the length of at least a portion of the frame member 200. Tongue portions 402 extend away from the elongated body 403, perpendicular to the axis defining the length of the elongated body 403. However, the tongue portions may be defined in the same plane as the flat surface of the elongated body 403.

There may be at least two tongue portions 402 extending from the elongated body 403 on a given fastening clip 400. In some examples, as shown in FIG. 4, there are three tongue portions 402. The tongue portion 402 may have a rounded contour as shown in FIG. 4.

Figure 4B:
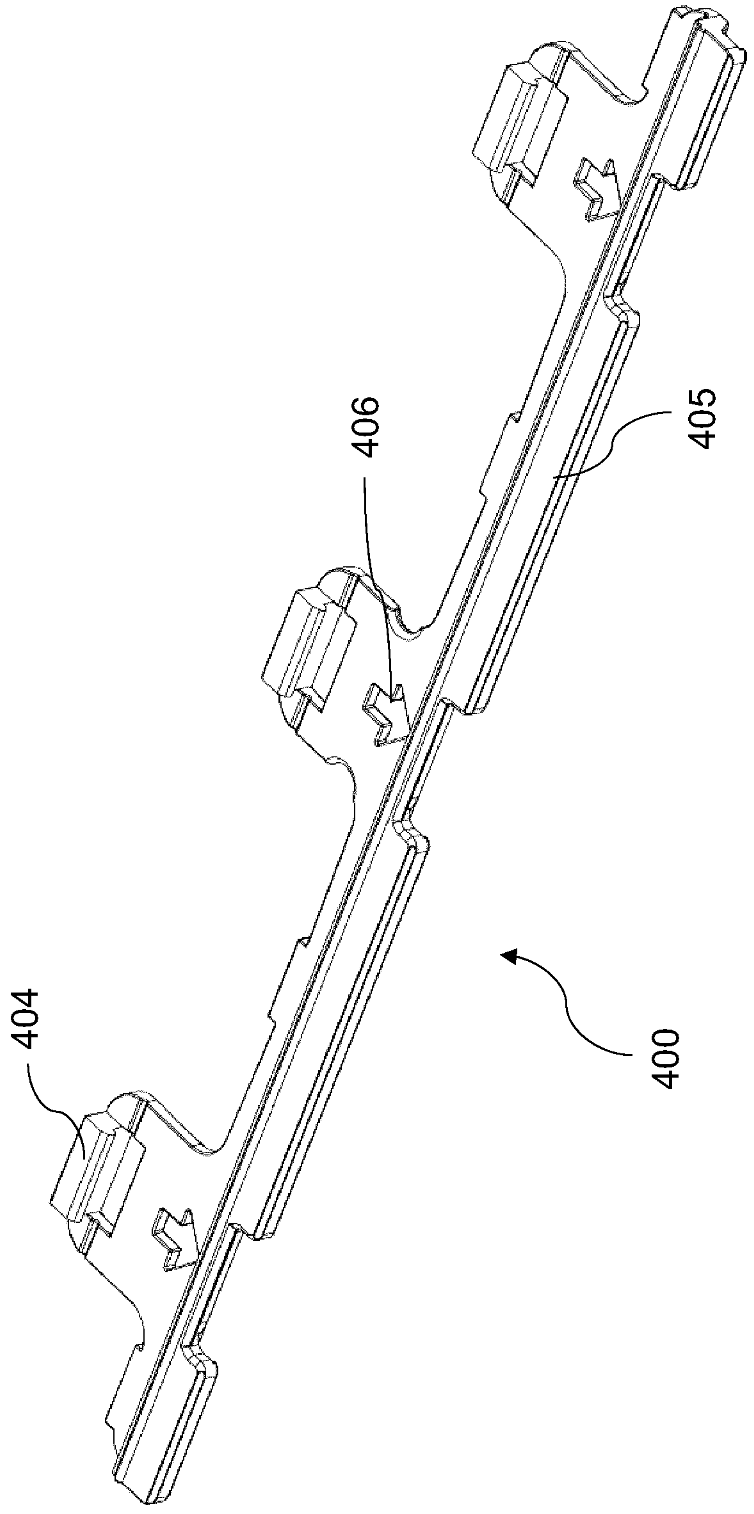
FIG. 4B is a drawing of a bottom perspective view of an exemplary fastening clip to be fitted to a furrow or cavity running the length of an exemplary frame member.
Figure 5:
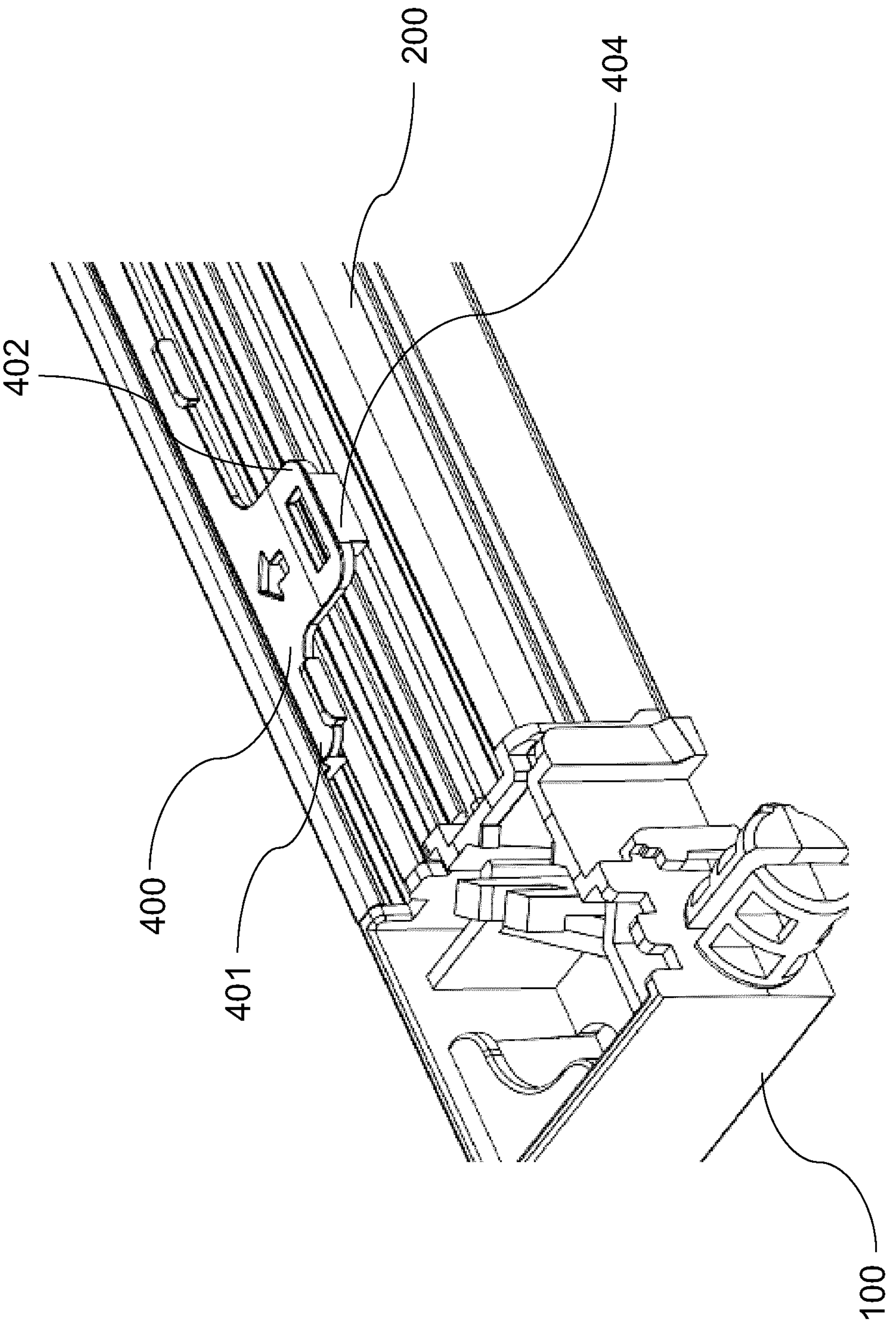
FIG. 5 is a front perspective view of an exemplary fastening clip joined to an exemplary frame member that is connected to an exemplary corner piece.

The tongue portion 402 may have a portion for attaching to an edge of the frame member 200. For instance, the attaching portion may be a hooked tooth portion 404 extending at an angle downward from the tongue portion 402 as shown in FIGS. 4B and 5. The tooth portion 404 allows for the hooking onto an edge of the frame member 200, such as an outside edge of the frame member 200.

Figure 9:
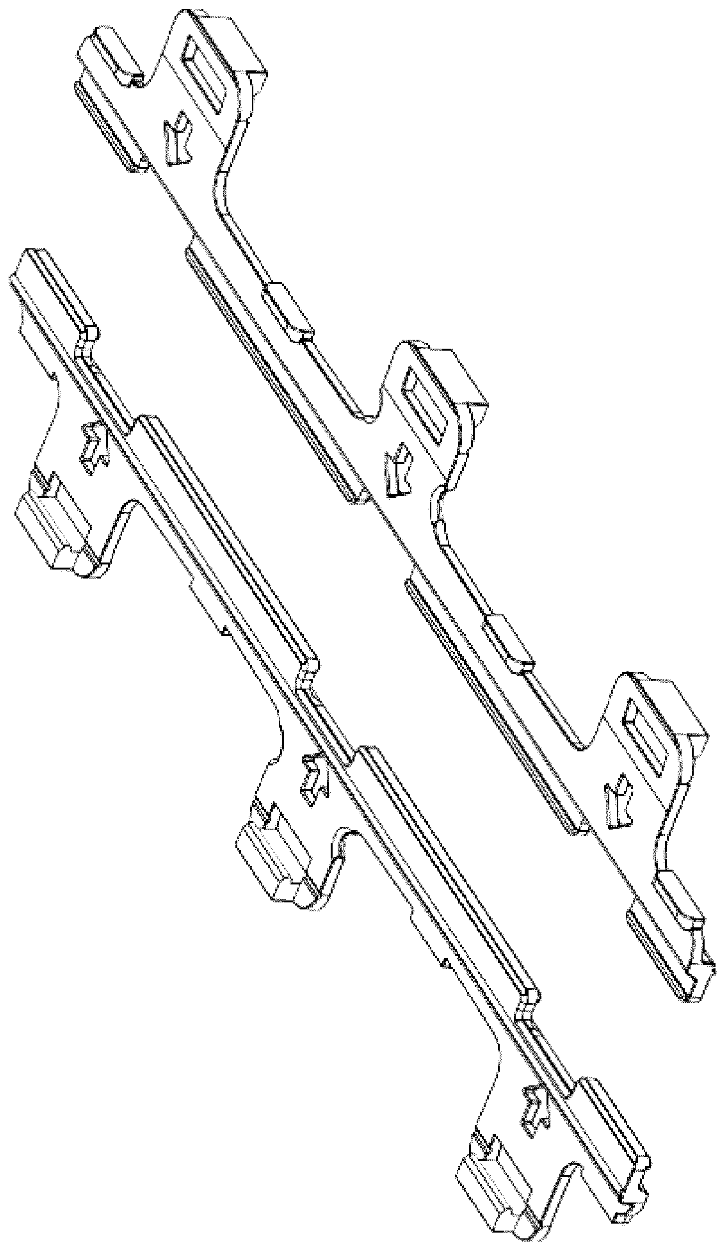
FIG. 9 is a drawing of a perspective view of two exemplary fastening clips.
Figure 10:
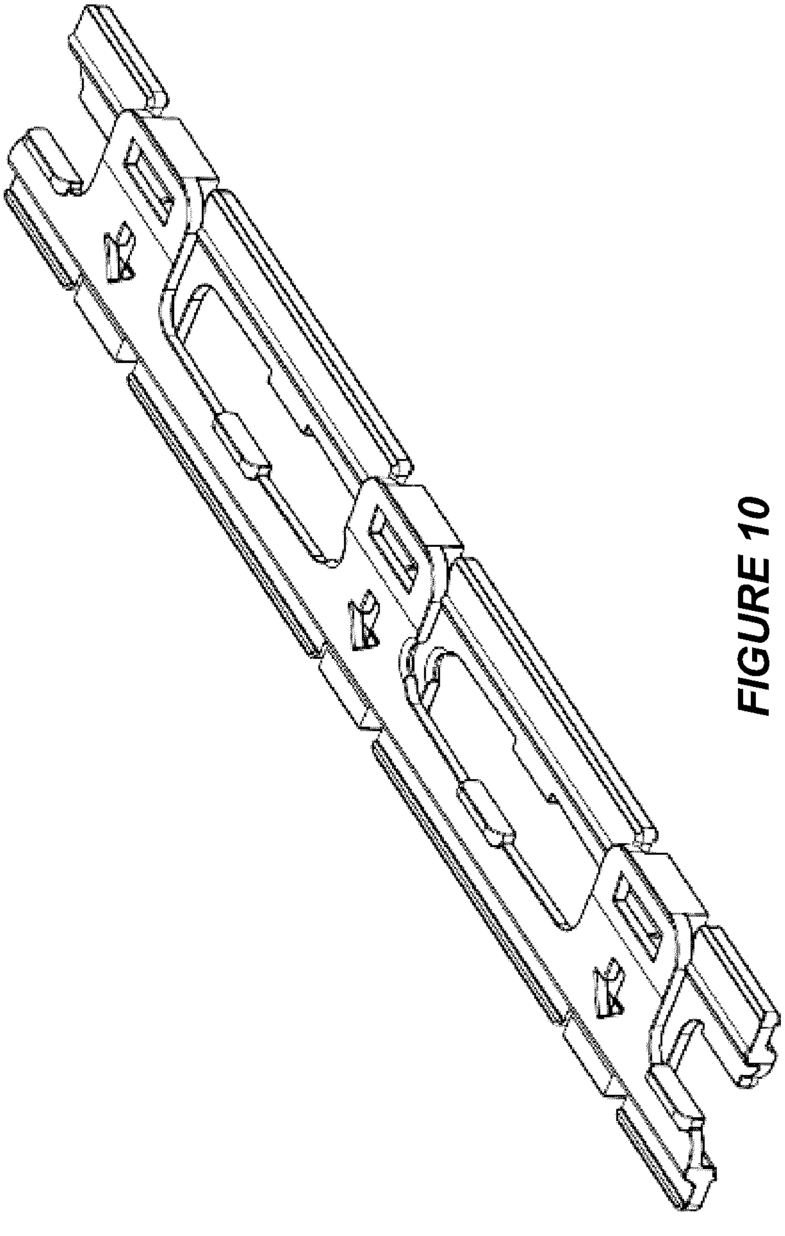
FIG. 10 is a drawing of a perspective view of two interlocked exemplary fastening clips.
Figure 11:
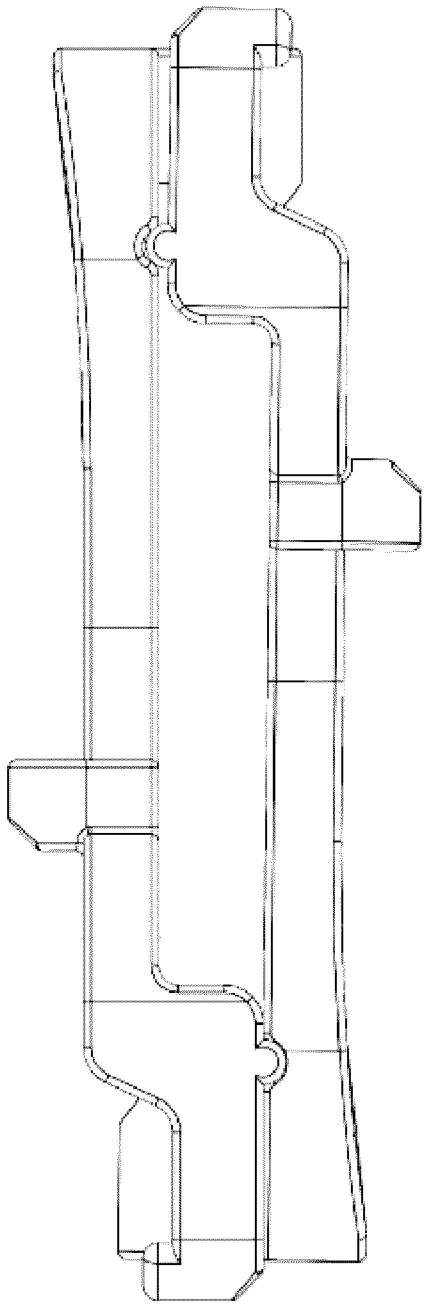
FIG. 11 is a drawing of a front view of two interlocked exemplary fastening clips.

In some embodiments, the tongue portion 402 may also include an opening 407 for receiving, e.g., a tooth portion 404 of another fastening clip 400, such that the receiving of the tooth portion 404 into the opening 407 results in a locking fit between the two fastening clips 400 (which may be advantageous, e.g., during transport, to reduce the amount of free parts) (as shown in FIG. 9—when the fastening clips 400 are separate; and as shown in FIGS. 10 and 11—when the fastening clips 400 are interlocked).

The angled projection 401 is dimensioned to run along a length of at least a portion of the elongated body 403 for insertion into the cavity of the frame member 200. For example, this is shown in FIG. 5, where the angled projection 401 fits into the cavity of the frame member 200. The angled projection 401 is configured to fit into the cavity once the canvas is laid over the frame member 200. The angled projection 401 is angled such as to push the canvas into the cavity of the frame member 200, securing the canvas to the frame member 200. The attaching portion (e.g. hooked tooth portion 404) of the fastening clip 400 then hooks or catches the edge of the frame member 200. The combination of the attaching portion and the angled projection 401 fix the fastening clip 400 to the frame member 200 while the canvas is pushed into the cavity of the frame member 200 by the angled projection 401. This fixing of the fastening clip 400 to the frame member 200 results equally in the fastening of the canvas to the frame member 200, held within the groove of the frame member 200.

The angled projection 401 may also have one or more protruding portions 405 for further fastening the fastening clip 400 to the frame member 200. The protruding portion 405 is configured to extend from the angled projection 401 such that it may enter laterally and abut the upper wall of the frame member 200 forming the cavity. The protruding portion 405 also further maintains the canvas within the cavity of the frame member 200.

The protruding portion 405 may be flat and may be parallel to the flat surface of the elongated body 403 and the tongue portion 402.

In some examples, there may be three protruding portions 405. In some examples, there may be one protruding portion 405 running along the length or a substantial length of the elongated body 403. However, it will be understood that the number of protruding portions 405 may vary without departing from the present teachings.

In some examples, the fastening clip 400 may include a marker 406, e.g., such as an arrow pointing to the protruding portion 405, indicating where pressure or a force should first be applied to a surface (e.g. the upper surface) of the fastening clip 400 such that the fastening clip 400 is secured to the frame member 200, maintaining the canvas 500 in place.

The fastening clip 400 may be made, in some examples, of plastic. In some examples, the fastening clip 400 may be 3D-printed.

More than one fastening clip 400 may be placed along a length of the frame member 200. The number of fastening clips 400 to be placed along the length of the frame member 200 may vary as a function of the length of the frame member 200.

Figure 6:
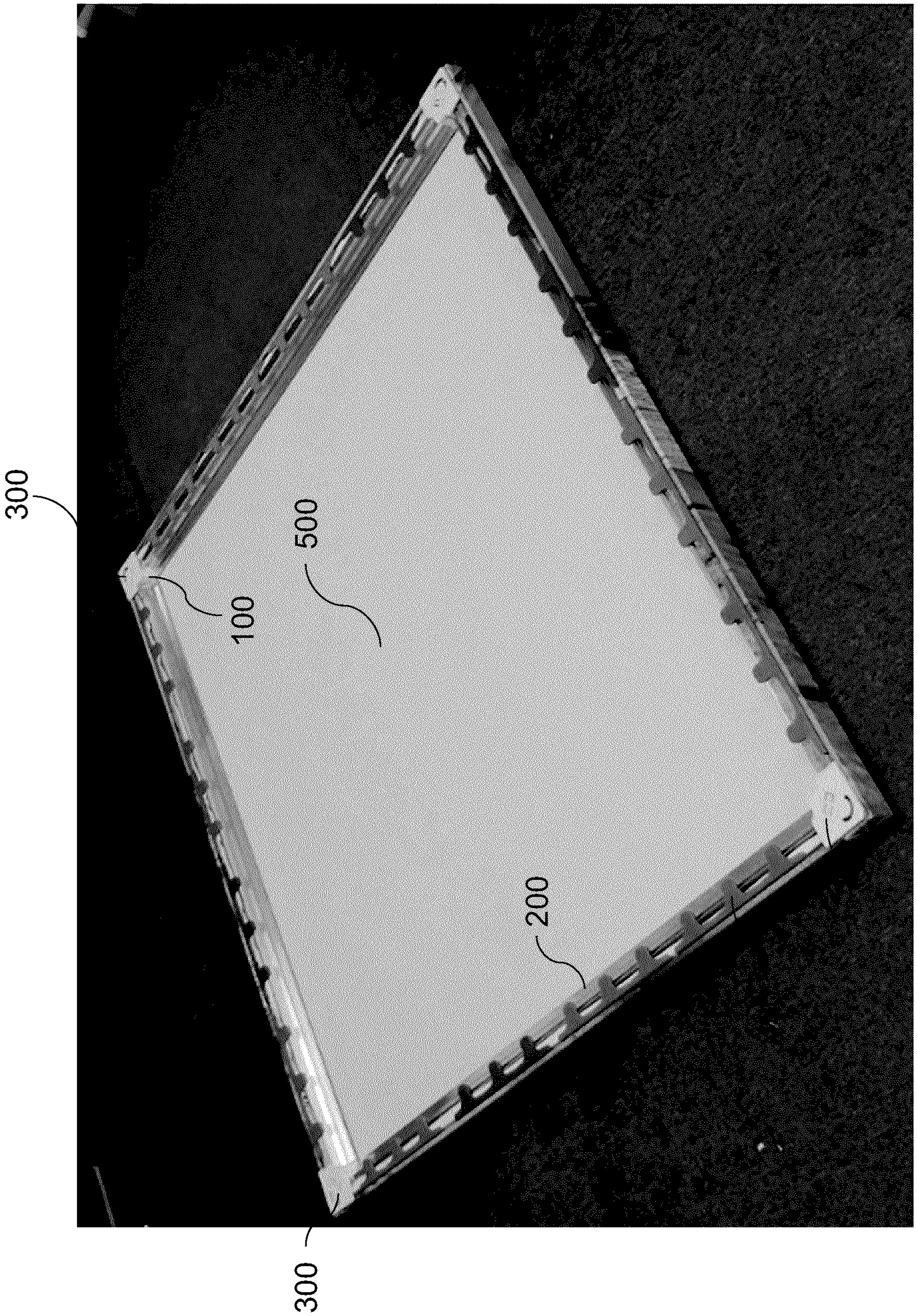
FIG. 6 is a drawing of an exemplary assembled frame structure securing a taut canvas.

The Frame Member:

Reference is made to FIG. 5, illustrating a portion of an exemplary frame member 200. Frame members 200 are also shown in FIG. 6, interconnected by the corner piece 100.

The frame members 200, along with the corner pieces 100, form the frame structure. Each of the frame members 200 form one side of the frame structure.

The frame member 200 is an elongated member, where the length varies as a function of the dimensions of the canvas. In some examples, smaller frame segments may be interconnected to form a frame member 200 of a designated length to fit the dimensions of the canvas.

The frame member 200 may have a groove running along its length to receive a portion of the canvas, and into the which the canvas may be secured to the frame member 200. The canvas may be secured to the frame member 200 using a fastening.

In some examples, the fastening may be a fastening clip 400 as described herein.

In some examples, the frame member 200 may be extruded and may be made out of metal. In other examples, the frame member 200 may be made out of wood or plastic, sufficient to withstand the force of the canvas under tension secured to the frame member 200.

The frame member 200 may also have an inner cavity or inner channel into which the connector 101 may be joined. However, in other examples, the frame member 200 may have a protrusion for connecting to a space of the corner piece 100 for receiving the frame member 200.

In some examples, the frame member 200 may be extruded.

The frame member 200 may have a rectangular or square prism-shaped body. However, it will be understood that the frame member may have a cylindrical body, triangle-prism body, etc.

Assembled Frame Structure:

Reference is now made to FIG. 6, illustrating an exemplary assembled frame structure to which a canvas 500 is secured.

The exemplary frame structure of FIG. 6 counts four frame members 200, four corner pieces 100, four caps 300 secured to the corner pieces 100 and twelve fastening clips 400. The canvas 500 is secured to the frame structure. It will be understood that the number of parts forming the frame structure may vary depending on the desired configuration of the frame structure.

The canvas 500 is secured to the frame members 200 by the fastening clips 400, joined to the frame members 200. The angled projection 401 of the fastening clip 400 enters the groove of the frame member 200, pushing the canvas into the groove of the frame member 200.

The frame members 200 are rotated, positioned flat with respect to the ground, and locked in the rotated position by the corner piece 100, the rotated frame members 200 applying additional tension to the canvas 500 that is taut.

When the frame structure is turned over such as to display the image present on the frame in the example of FIG. 6, the taut canvas 500 covers the frame structure such that the frame structure is not visible when the canvas 500 is mounted to a wall.

To disassemble the frame structure, it is possible to remove the caps 300 and the fastening clips 400, releasing the canvas 500. The fixing mechanism of the corner piece 100 can be unlocked, therefore allowing the frame members 200 to return to their unrotated position.

The frame members 200 may also be disconnected from the corner pieces 100 (with or without first returning the rotated frame members 200 to their unrotated position).

Figure 7A:
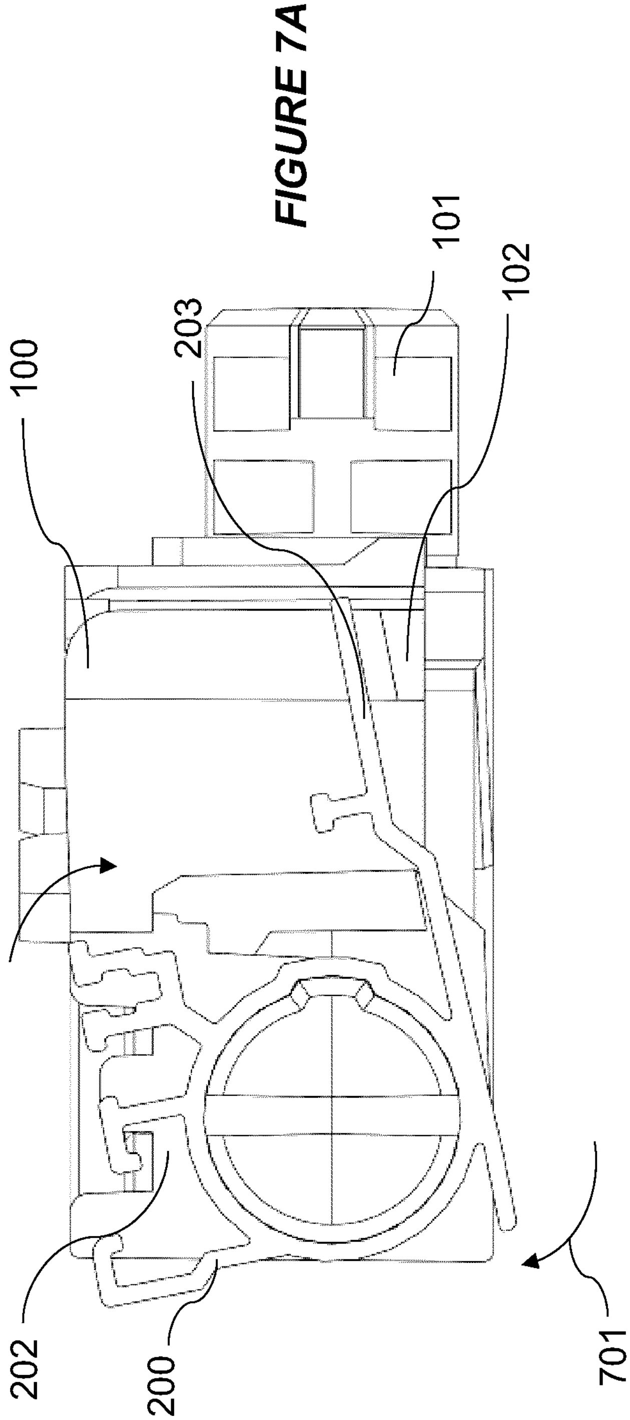
FIG. 7A is a drawing of a cross-sectional side view of an exemplary frame member, joined to an exemplary corner piece, prior to rotation of the frame member to apply additional tension to the canvas attached to the frame member.
Figure 7B:
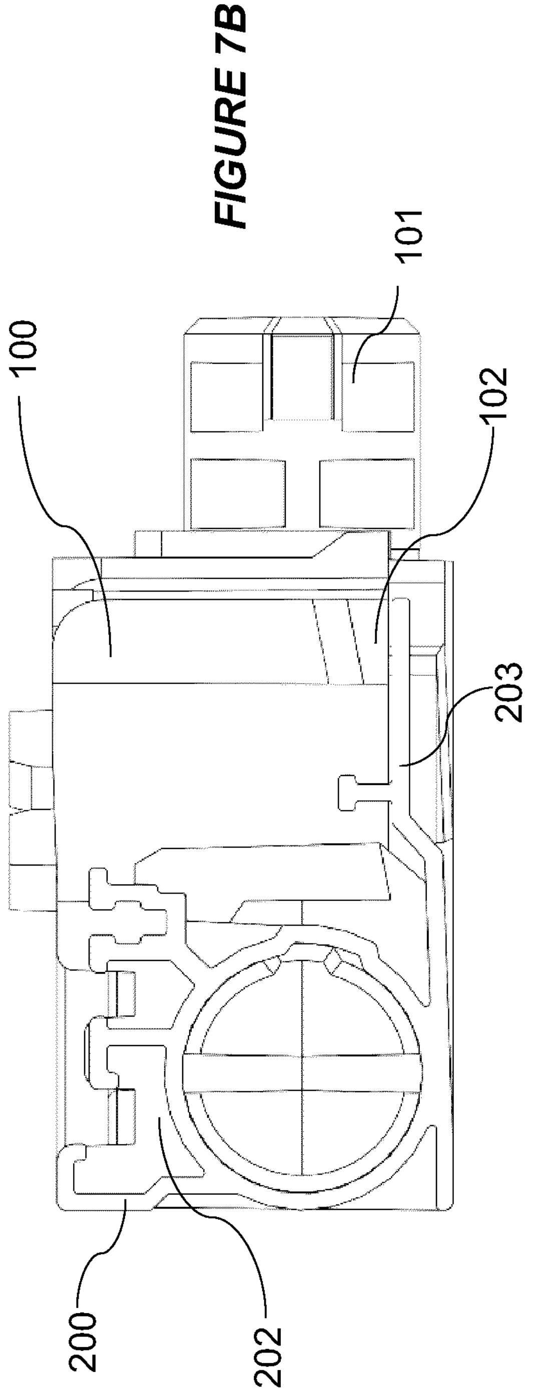
FIG. 7B is a drawing of a cross-sectional side view of an exemplary frame member, joined to an exemplary corner piece, after rotation of the frame member such that tension is applied to the canvas attached to the frame member, where the frame member is fixed in the rotated position by the corner piece.

The Rotation of the Frame Members:

Reference is now made to FIGS. 7A and 7B. FIGS. 7A and 7B show a cross sectional view of frame member 200 to which a corner piece 100 is connected, shown behind the frame member 200. In FIG. 7A, the frame member 200 is in an unrotated position. In FIG. 7B, the frame member 200 is in a rotated position for applying tension to the canvas.

FIGS. 7A and 7B show an example of a change in configuration of the frame member 200, connected to the corner piece 100, from an unrotated position to a rotated position. The unrotated position may also be set by the abutting protuberance 104, serving as a guide or a key (fitting into a cavity of the frame member 200) when connecting the frame member 200 to the corner piece 100.

The canvas material may be secured to the frame member 200 in its cavity 202 (that may run along a length of the frame member 200).

Once the canvas secured to the cavity 202, the frame member 200 may undergo a rotation 701. The rotation 701 is performed, in the example of FIG. 7, along the rotational axis defined by the center of the connector 101, parallel to the length of the frame member 200. It will be understood that the rotation performed may be around any rotational axis that is parallel to the length of the frame member 200. In the example of FIGS. 7A and 7B, the rotation 701 is under 45 degrees, however it will be understood that the amount of rotation undergone by the frame member 200 may vary without departing from the present teachings.

In some examples, as shown in FIGS. 7A and 7B, the frame member 200 goes from being at an angle with the ground (i.e. a flat surface) to being parallel to the ground once rotated. The contact point between the canvas and the frame member 200 moves during rotation, causing the canvas to move closer to and contour the shape of the frame member 200.

Once the frame member 200 is rotated and tension is applied to the canvas, the frame member 200 is fixed in place in its rotated configuration, or else the torque applied to the frame member 200 by the canvas under tension may risk rotating the frame member 200 back to its original position, reducing the tension on the canvas, the canvas no longer taut. The rotated frame member 200 is fixed in place by the corner piece 100.

As shown in FIGS. 7A and 7B, the locking projection 102 is first under the wall 203 of the frame member 200 in FIG. 7A. In FIG. 7B, once the frame member 200 is rotated, the rotated wall 203 is under the locking projection 102. The locking projection 102 extends over the rotated wall 203. The locking projection 102 serves as a barrier preventing the rotated frame member 200 from rotating in the opposite direction as the wall 203 abuts the locking projection 102.

It will be understood that the rotation mechanism for applying tension to a canvas shown in Figures in 7A and 7B are an exemplary mechanism, and that other mechanisms for rotating the frame member 200, fixing the rotated frame member 200, and applying additional tension to the canvas may be used without departing from the present teachings.

Figure 12:
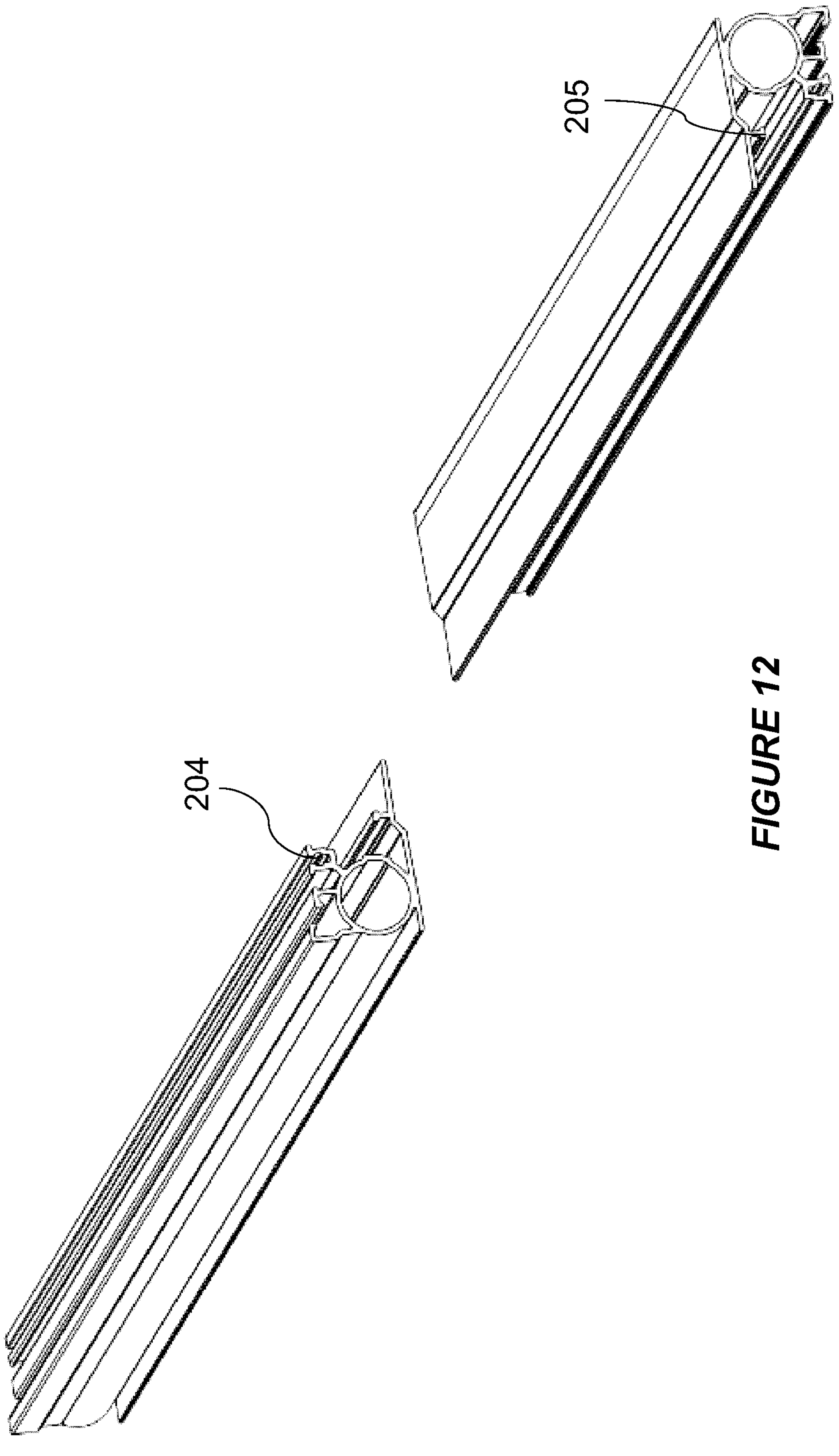
FIG. 12 is a drawing of a perspective view of two exemplary frame members.
Figure 13:
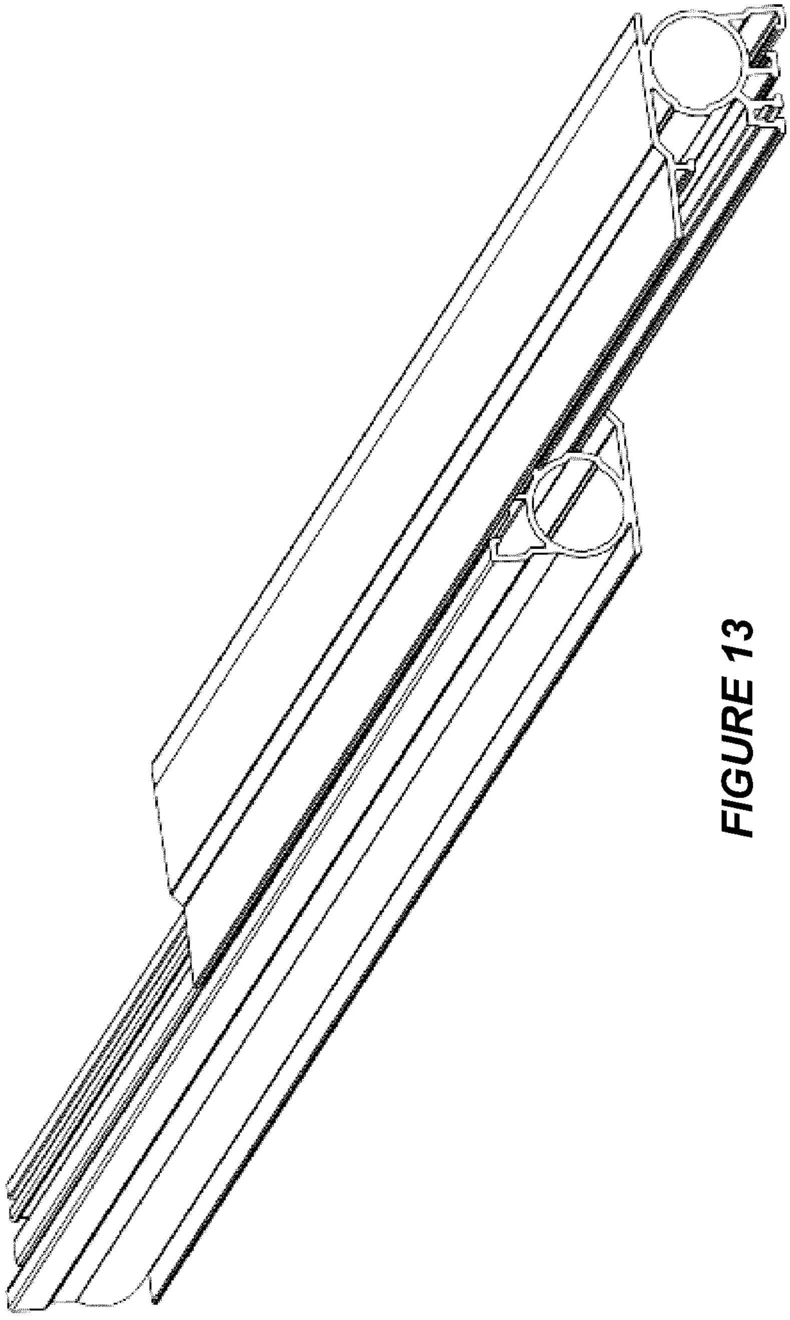
FIG. 13 is a drawing of a perspective view of two exemplary frame members that are inserted one in another.
Figure 14:
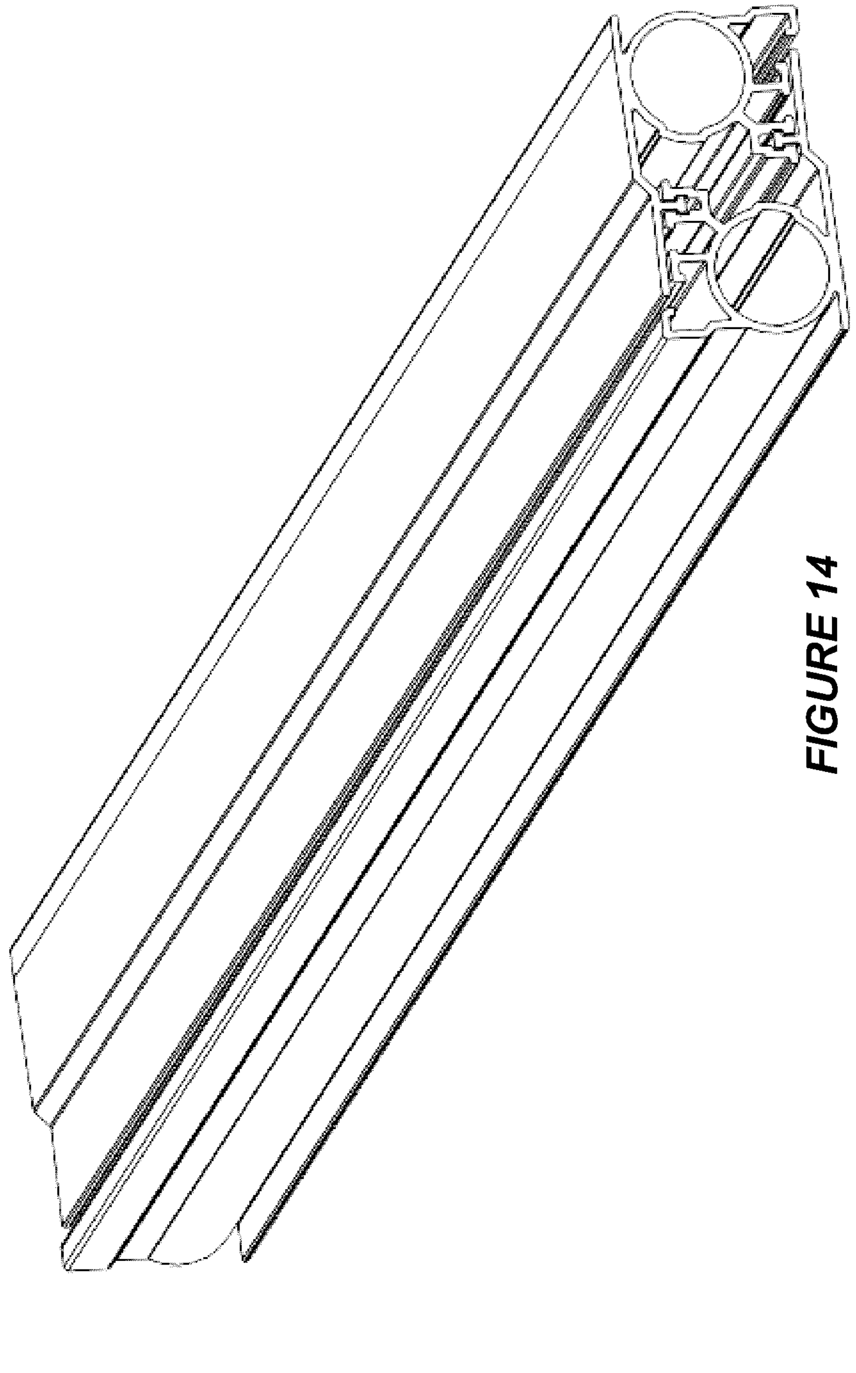
FIG. 14 is a drawing of a perspective view of two exemplary frame members that are inserted one in another.

Transport of Components of Frame System:

As shown in FIGS. 12-14, the frame members 200 can be inserted into one another, where one of the frame member 200 is orientated in an inversed position with respect to the other.

One frame member 200 has an elongated projection 205 that slides into a groove 204 of the other, resulting in an interlocking fit for transport.

Figure 15:
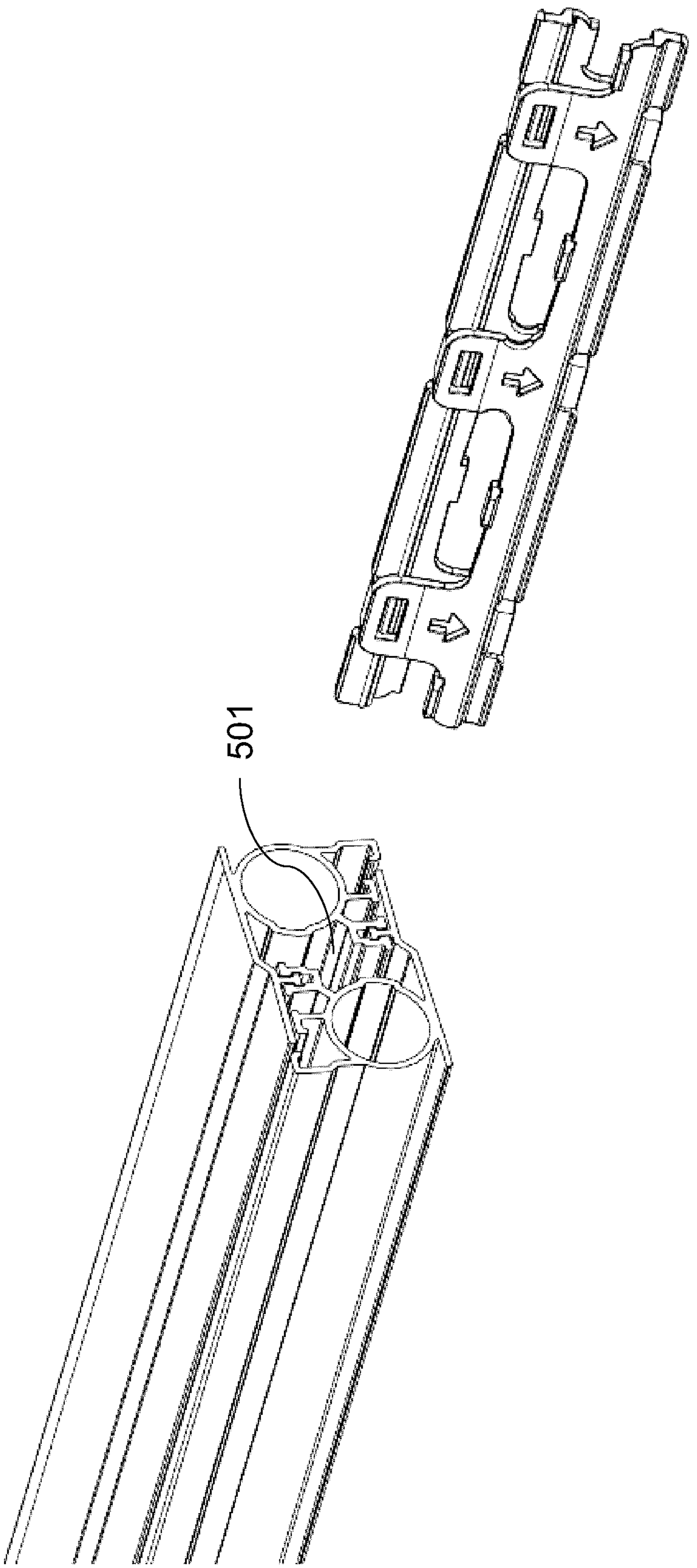
FIG. 15 is a drawing of a perspective view of two exemplary frame members that are inserted one in another with a space for receiving two interlocked exemplary fastening clips.
Figure 16:
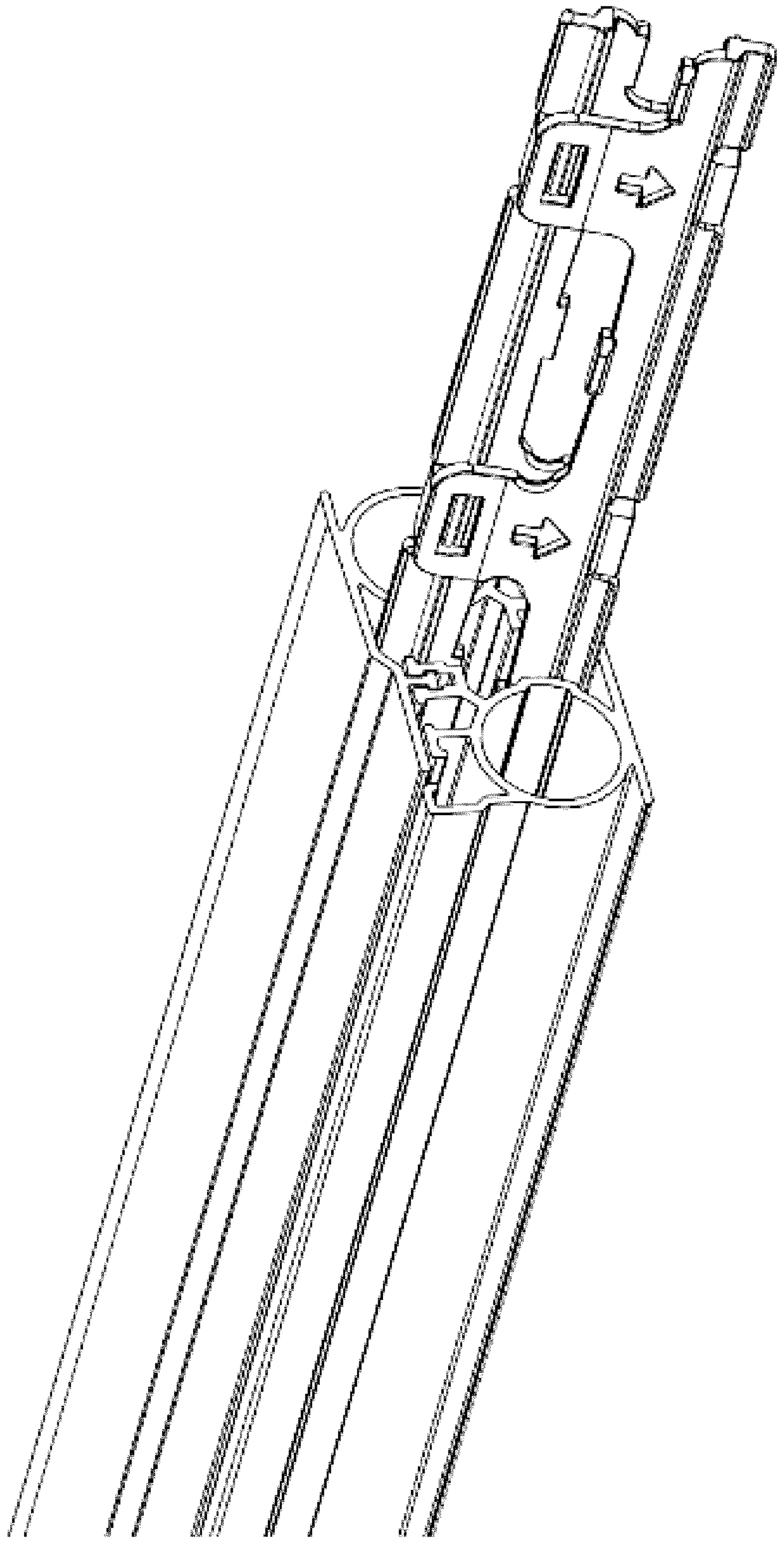
FIG. 16 is a drawing of a perspective view of two exemplary frame members that are inserted one in another with a space that is receiving two interlocked exemplary fastening clips.
Figure 17:
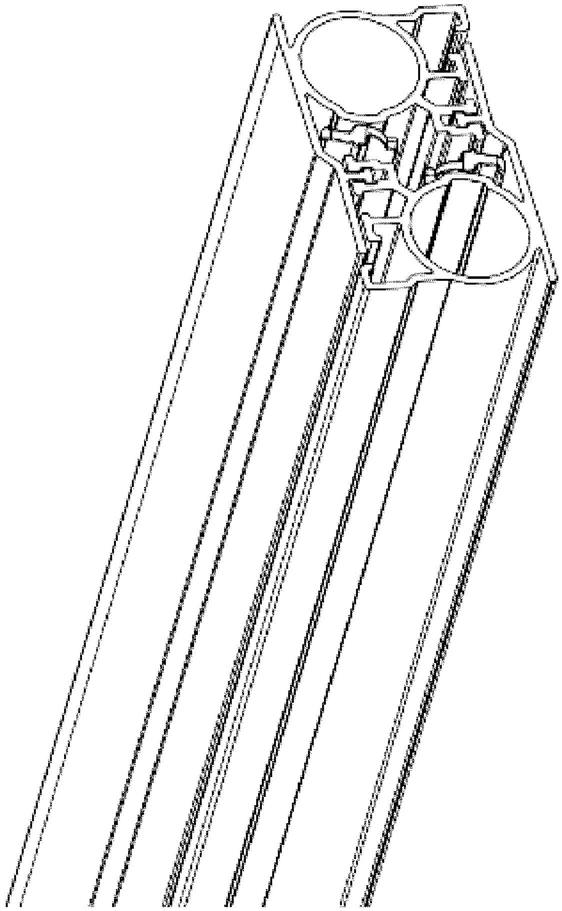
FIG. 17 is a drawing of a perspective view of two exemplary frame members that are inserted one in another with a space that has received two interlocked exemplary fastening clips.

The interlocked frame members 200 create a space 501 in between the frame members 200 that is sufficient to receive the interlocked fastening clips 400 as shown in FIGS. 15-17.

This insertion of the interlocked fastening clips 400 into the space 501 provided by the interlocked frame members 200 facilitates transportation of the components of the canvas system.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of applying tension to a canvas that is secured to a frame structure composed of frame members and corner pieces, wherein said frame members are interconnected using said corner pieces adapted to receive ends of said frame members to form said frame structure, and wherein each of said frame members comprises a longitudinal axis, comprising:

securing said canvas to a frame member of said frame members;

rotating said frame member of said frame members around a rotational axis that is parallel with the length of said frame member of said frame members to a rotated position, wherein said canvas, secured to said frame member of said frame members, increases in tension due to said rotating, and fixing said rotated frame member of said frame members in said rotated position using said corner piece of said corner pieces such that said increase in tension in said canvas is preserved, wherein said rotational axis is aligned with an axis running centrally along a length of a connector of said corner piece of said corner pieces for connecting said corner piece of said corner pieces to said frame member of said frame members.

2. The method as defined in claim 1, wherein said frame member of said frame members has an elongated prism body, and wherein said frame member of said frame members, prior to rotation, rests on an edge of said prism body on a flat surface, and after rotation, a face of said rotated frame member of said rotated frame members is resting on said flat surface.

3. The method as defined in claim 2, wherein said canvas, after said rotation, rests on a face of said frame member of said frame members opposite said face resting on said flat surface.

4. The method as defined in claim 1, wherein said frame member of said frame members that is rotated is at an angle with a flat surface while said corner piece of said corner pieces has one of its faces flat on said flat surface, and wherein said rotated frame member of said frame members rests flat on said flat surface and said corner piece rests on said one of its faces flat on said flat surface.

5. The method as defined in claim 1, wherein said frame member of said frame members is connected to a face of said corner piece, and wherein said rotated frame member of said frame members is fixed in said rotated position using a protrusion of said corner piece of said corner pieces.

6. The method as defined in claim 5, wherein said protrusion is located on said face of said corner piece.

7. The method as defined in claim 1, further comprising placing excess canvas material in a cavity of said corner piece of said corner pieces.

8. The method as defined in claim 7, after said placing excess canvas material in said cavity of said corner piece of said corner pieces, further comprising fitting a cap on a face of said corner piece of said corner pieces comprising an opening providing access to said cavity.

9. The corner piece as defined in claim 1, wherein said corner piece is one of die casted and 3D printed.

10. The method as defined in claim 1, wherein said frame member of said frame members is rotated along said rotational axis in a direction such that, after said rotation, a greater portion of said canvas contours the shape of said frame member of said frame members than prior to said rotation.

11. A corner piece adapted to connect to ends of frame members of a frame assembly for receiving and securing a canvas, comprising:

a rectangular prism body comprising:

- an inner cavity adapted to receive excess canvas material;
- a first face having a flat portion;
- a second face, opposite to said first face, comprising an opening providing access to said inner cavity;
- a first connector located on a third face, said first connector adapted to connect to a first frame member of said frame members; and
- a second connector located on a fourth face that meets at an angle with said third face, said second connector adapted to connect to a second frame member of said frame members; and a fastener configured to secure in said inner cavity said excess canvas material that is received in said inner cavity.

12. The corner piece as defined in claim 11, wherein the fastener is a cap configured to fit to said second face of said rectangular prism body and cover said opening, sealing said inner cavity, wherein said cap fitted to said second face secures said excess canvas material that is received in said inner cavity.

13. The corner piece as defined in claim 12, wherein said cap is detachable from said prism body.

14. The corner piece as defined in claim 11, wherein said first connector is a first protrusion, and said second connector is a second protrusion.

15. The corner piece as defined in claim 14, wherein said first protrusion and said second protrusion are each a male end configured to be placed into a corresponding female cavity or channel of a frame member of said frame members.

16. The corner piece as defined in claim 11, wherein each of said first protrusion and said second protrusion comprises an abutting protuberance on its surface configured to limit rotation of said frame member of said frame members connected to said corner piece.

17. The corner piece as defined in claim 12, wherein said rectangular prism body comprises a locking projection extending upward and out from said opening of said second face, and said locking projection is configured to pass through an opening of said cap and fasten said cap to said prism body.

18. The corner piece as defined in claim 17, wherein the end of said locking projection that is extending upward and out from said opening is hooked.

19. The corner piece as defined in claim 12, wherein said corner piece comprises, on edges forming said opening, indentations adapted to receive said cap, and said cap comprises along its edges protrusions adapted to mate with said indentations.

* * * * *